(12) United States Patent

Goodrick et al.

(10) Patent No.: US 12,612,265 B1

(45) Date of Patent: Apr. 28, 2026

(54) STABLE POSITIONING OF PRODUCT FOR ROBOTIC PICKING OFF ROLLER TABLE

(71) Applicant: Smart Vision Works, Inc., Orem, UT (US)

(72) Inventors: Daniel Goodrick, Orem, UT (US); Beau Tippetts, Orem, UT (US)

( * ) Notice: Subject to any disclaimer, the term of this patent is extended or adjusted under 35 U.S.C. 154(b) by 238 days.

(21) Appl. No.: 17/844,529

(22) Filed: Jun. 20, 2022

Related U.S. Application Data

(60) Provisional application No. 63/212,496, filed on Jun. 18, 2021.

(51) Int. Cl.

| | |
|---|---|
| *B65G 47/90* | (2006.01) |
| *B25J 9/00* | (2006.01) |
| *B65B 35/42* | (2006.01) |
| *B65B 35/56* | (2006.01) |
| *B65G 13/075* | (2006.01) |
| *B65G 17/24* | (2006.01) |

(52) U.S. Cl.
CPC .......... *B65G 47/905* (2013.01); *B25J 9/0093* (2013.01); *B65B 35/42* (2013.01); *B65B 35/56* (2013.01); *B65G 13/075* (2013.01); *B65G 17/24* (2013.01); *B65G 2203/0233* (2013.01); *B65G 2203/041* (2013.01)

(58) Field of Classification Search
CPC ............... B65G 47/905; B65G 13/075; B65G 2203/0233; B65G 2203/041; B65G 13/07; B65G 13/071; B65G 39/20; B65G 17/24; B65B 35/42; B65B 35/56
See application file for complete search history.

(56) References Cited

U.S. PATENT DOCUMENTS

| | | | | |
|---|---|---|---|---|
| 3,770,096 | A | * | 11/1973 | Stohlquist .............. B65G 17/24 |
| | | | | 198/779 |
| 4,726,898 | A | * | 2/1988 | Mills ...................... B65G 47/24 |
| | | | | 209/939 |
| 5,181,596 | A | * | 1/1993 | Warkentin .............. B07C 5/362 |
| | | | | 198/779 |

(Continued)

FOREIGN PATENT DOCUMENTS

| | | | | |
|---|---|---|---|---|
| JP | | H1159875 A | * | 3/1999 |
| JP | | 2017189749 A | * | 10/2017 |

(Continued)

OTHER PUBLICATIONS

JP 2017-189749 A—Yoshida et al., Article Selector, Filed: Apr. 14, 2016 Pub: Oct. 19, 2017, English Translation (Year: 2017).*

(Continued)

*Primary Examiner* — Jason Holloway
*Assistant Examiner* — Benjamin J Brosh
(74) *Attorney, Agent, or Firm* — Shapiro IP Law; Joseph Shapiro

(57) ABSTRACT

In a roller conveyor system in which a product is being conveyed on rollers, a rotational arrestor may be used to dampen and/or stop rotation of rollers after a camera captures an image of the product where such image will be used to predict a location of the product at a subsequent time for picking or other manipulation. The rotational arrestor may comprise a shortened or limited-length traction bar that allows the rotational friction of the rollers to dampen and/or stop rotation of the rollers when the traction bar is not interacting with the rollers.

10 Claims, 52 Drawing Sheets

(56) References Cited

U.S. PATENT DOCUMENTS

| | | | | |
|---|---|---|---|---|
| 5,533,628 | A * | 7/1996 | Tao | B07C 5/3422 |
| | | | | 209/939 |
| 5,732,147 | A * | 3/1998 | Tao | B07C 5/3422 |
| | | | | 382/110 |
| 5,901,854 | A * | 5/1999 | Ishii | B65G 47/965 |
| | | | | 209/912 |
| 6,079,542 | A * | 6/2000 | Blood | B07C 5/342 |
| | | | | 198/384 |
| 6,610,953 | B1 * | 8/2003 | Tao | G01N 21/3563 |
| | | | | 209/11 |
| 9,475,643 | B1 * | 10/2016 | Odman | B65G 39/20 |
| 11,845,110 | B2 * | 12/2023 | Lapointe | B65G 47/28 |
| 2011/0309004 | A1 * | 12/2011 | Morley | B07C 5/36 |
| | | | | 209/577 |
| 2015/0283585 | A1 * | 10/2015 | Gual Pasalodos | |
| | | | | G01N 21/8806 |
| | | | | 198/339.1 |
| 2016/0159580 | A1 * | 6/2016 | Ruigrok | B65G 17/24 |
| | | | | 198/779 |
| 2016/0346811 | A1 * | 12/2016 | Iino | B25J 9/1697 |
| 2017/0210565 | A1 * | 7/2017 | Reichel | B65G 13/075 |
| 2018/0370023 | A1 * | 12/2018 | Ooba | B25J 15/0095 |
| 2020/0160011 | A1 * | 5/2020 | Wagner | B65G 47/12 |
| 2022/0118485 | A1 * | 4/2022 | Lapointe | B65G 47/248 |
| 2024/0261825 | A1 * | 8/2024 | Morley | B65G 17/16 |

FOREIGN PATENT DOCUMENTS

| | | | | | |
|---|---|---|---|---|---|
| KR | 20190011855 | A * | 2/2019 | | B25J 9/0093 |
| KR | 102218894 | B1 * | 2/2021 | | B65G 47/90 |
| WO | WO-2021156459 | A1 * | 8/2021 | | B07C 5/36 |

OTHER PUBLICATIONS

NPL, Author: SLS, "How Ball Bearings Reduce Friction", Webpage, Retrieved from the internet, NPL date Oct. 26, 2020, URL: <https://blog.slsbearings.com/how-ball-bearings-reduce-friction> (Year: 2020).*

JPH1159875A, Article Inspection Device, Ishii, Filed: Aug. 6, 1997 Pub: Mar. 2, 1999, English Translation (Year: 1999).*

KR2019-0011855A, Static Work Distribution Device, System, and Method using the same, Lim et al., Filed: Jul. 25, 2017 Pub: Feb. 8, 2019, English Translation (Year: 2019).*

KR10-2218894B1, Device for Double Recognition Image Treatment for Conveyor Belt and Method for the Same, Lee et al., Filed: Aug. 21, 2019 Pub: Feb. 23, 2021, English Translation (Year: 2021).*

* cited by examiner $t_1$ $t_2$ $t_3$ $t_4$ $t_5$ $t_6$ $t_7$ $t_8$ $$t_9$$

$t_{10}$ $$t_1$$

$t_1$ $t_2$ $t_3$ $t_4$ $t_5$ $$t_6$$

$t_7$ $t_8$ $t_9$ $$t_{10}$$

$t_7$ $t_8$ $t_{10}$ $t_1$ $t_2$ $t_3$ $t_4$ $t_5$ $t_6$ $t_7$ $t_8$ $$t_9$$

$$t_{10}$$

$t_1$ $t_3$ $t_5$ $t_6$ $t_{10}$

STABLE POSITIONING OF PRODUCT FOR ROBOTIC PICKING OFF ROLLER TABLE

BACKGROUND OF THE INVENTION

The present invention relates to computer vision systems that characterize and/or classify products conveyed on a roller table or roller conveyance system for 360-degree inspection by the computer vision system, or for inspection by the computer vision system from multiple sides/angles. More specifically it relates to the picking of said product with a robot while still on the roller table.

Computer vision systems are used to characterize products on a roller table or other system that rolls or re-orients a product to provide a 360-degree presentation (or presentation from multiple angles/orientations) of the product to one or more fixed-location inspection cameras or other sensors.

Based on the characterization/classification assigned to the product by the computer vision system (or other sensor or processing/computing system), a robot arm may pick the product and remove it from the roller table.

A roller table generally comprises a set of rollers that, when rolled or rotated, result in rolling or re-orientation of a product on the roller table.

Movement of the product relative to rollers after the product leaves the field-of-view of the vision system or other sensor system will often result in a failed pick because a product may move to a location that is different from the location predicted by the vision/sensor system. Such movement may occur as a result of roller rotation because of characteristics of the roller table (e.g., not level, rollers rolling at different rotational speeds, etc.) and the non-uniform surface, topography, shape, and/or weight distribution of the product. For example, a potato that is not a perfect sphere—i.e., almost all potatoes—may drift along the length of rollers or jump rollers when rotated/rolled/tumbled by the rollers.

FIGS. 1A-J show top-down view of an exemplary prior art system. As shown in FIGS. 1A-J, rollers 105*a-n* may be secured to track system 110, which may move rollers in direction 111. Camera 101 (not shown in FIGS. 1A-J), may have a field of view 102. As shown in FIG. 1A, field of view 102 roughly comprises rollers 105*b-g*. The rollers may be configured to roll when in field of view 102 so that products 103*a* and 103*b* may turn/roll/rotate in various directions to provide camera 101 with views of products 103*a* and 103*b* from multiple sides and/or angles. Many mechanical devices are known in the art to induce rolling for rollers 105*b-g* as shown in FIG. 1A. For example, as shown in FIG. 1K, traction bar 104 may be used to induce rolling in rollers. FIGS. 1A-J reflect the traction bar 104 shown in FIG. 1K. Rotational direction arrows 115 in FIGS. 1A-J show the rotational direction of rollers 105*a-n*. In some systems rollers may use other mechanisms to induce rolling such that rollers rotate in the direction opposite the direction shown in FIGS. 1A-J.

As shown in FIGS. 1A-J, the rotation of rollers 105*a-n* causes products 103*a* and 103*b* to roll over time, i.e., from time $t_1$ in FIG. 1A through time to in FIG. 1J as rollers 105*a-n* are moved in direction 111 along track 110. One shortcoming of the system shown in FIGS. 1A-J is that the rollers 105*b-d*, which are supporting and conveying products 103*a* and 103*b*, may continue to roll after leaving field of view 102. The continued rolling may result where, as shown in FIG. 1K, traction bar 104 extends beyond fieldof-view 102, or alternatively where friction in the rollers is not sufficient to arrest rotation after the rollers have passed the end of the traction bar.

Continued rotation of the rollers after leaving field-of-view 102 may be problematic because rotation of the rollers may cause a product to drift along the rollers or to jump rollers (i.e., to settle between a different set of rollers). For example, as shown in FIGS. 1A-J, from time $t_1$-$t_{10}$, product 103*a* remains between rollers 105*b* and 105*c* but drifts along the boundary between rollers 105*b* and 105*c*, gradually drifting downward from the top of the figure toward the bottom or the figure. Although not shown in FIGS. 1A-J, product 103*a* may also jump rollers, i.e., settle between rollers 105*c* and 105*d*, or between rollers 105*a* and 105*b*. This can be problematic because once product 103*a* exits field of view 102, picker system 200 may not be able to predict the rollers supporting product 103*a* and/or the location along the boundary between such rollers to successfully pick product 103*a*.

For example, FIG. 1F shows the location along the boundary between rollers 103*b* and 103*c* of product 103*a* at time $t_6$—just before product 103*a* exits field of view 102. But, as shown in FIGS. 1G-J, because rollers 105*b* and 105*c* continue to roll at times $t_7$-$t_{10}$ after leaving field of view 102, product 103*a* continues drift along boundary between rollers 105*b* and 105*c*. As shown in FIG. 1J, when system 200 attempts to use picker 106 to pick product 103*a* at time $t_{10}$, the pick is unsuccessful because picker 106 attempts to pick at the location of phantom product 180—the point along the boundary between rollers 105*b* and 105*c* at which product was located when it exited field of view 102. But product 103*a* is not there and has instead drifted to the location shown at time $t_{10}$ in FIG. 1J.

Because of the possibility of a failed pick (or other product manipulation), there exists a need to prevent, decrease, mitigate, or otherwise address product drift and/or roller jumping after leaving the vision system's (or other sensory system's) field of view.

BRIEF SUMMARY OF THE INVENTION

In a roller conveyor system in which a product is being conveyed on rollers, a rotational arrestor may be used to dampen and/or stop rotation of rollers after a camera captures an image of the product where such image will be used to predict a location of the product at a subsequent time for picking or other manipulation. The rotational arrestor may comprise a shortened or limited-length traction bar that allows the rotational friction of the rollers to dampen and/or stop rotation of the rollers when the traction bar is not interacting with the rollers.

DETAILED DESCRIPTION OF THE INVENTION

Figure 1A:
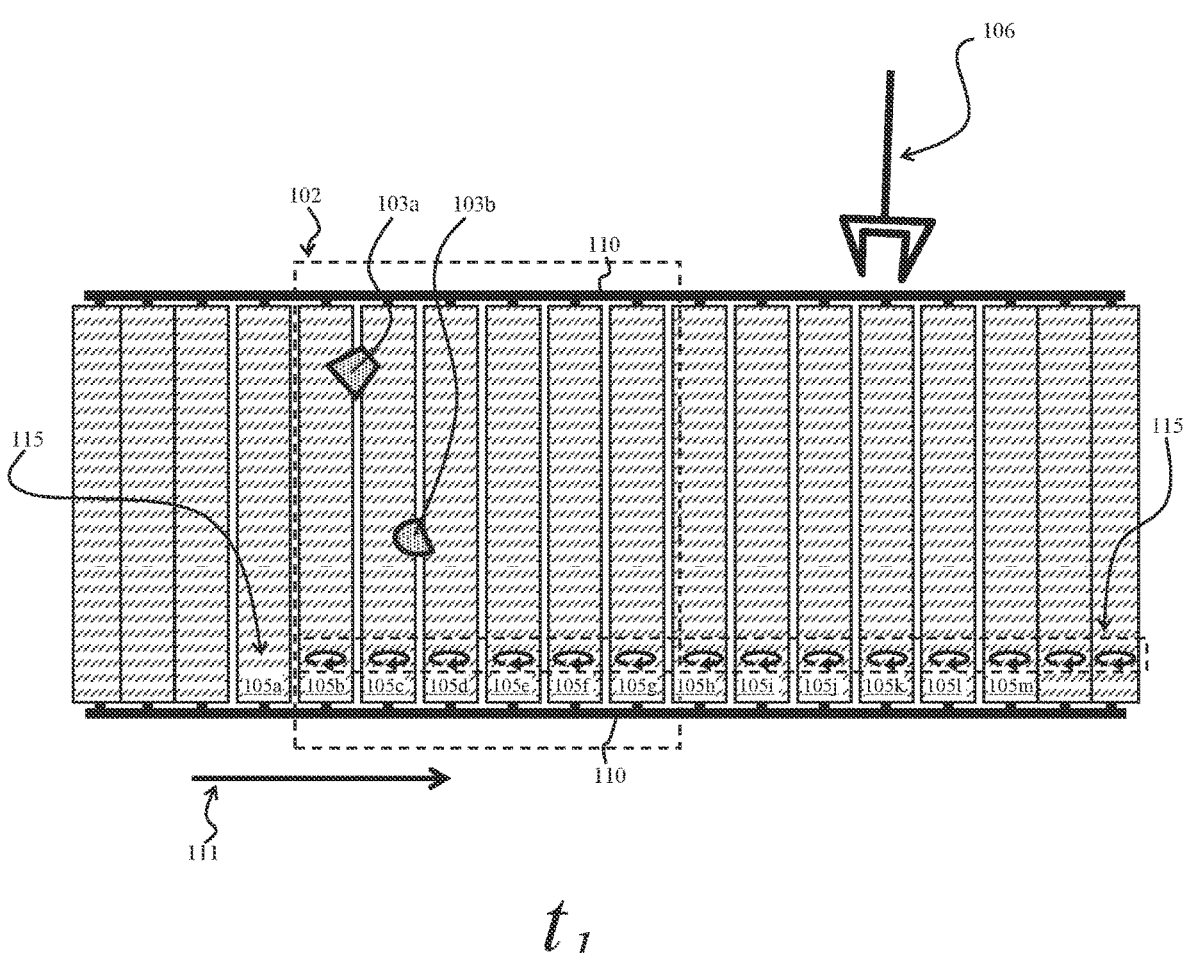
FIGS. 1A-J show overhead-perspective time snapshots of products being conveyed along a prior art embodiment of a roller conveyor system.
Figure 1B:
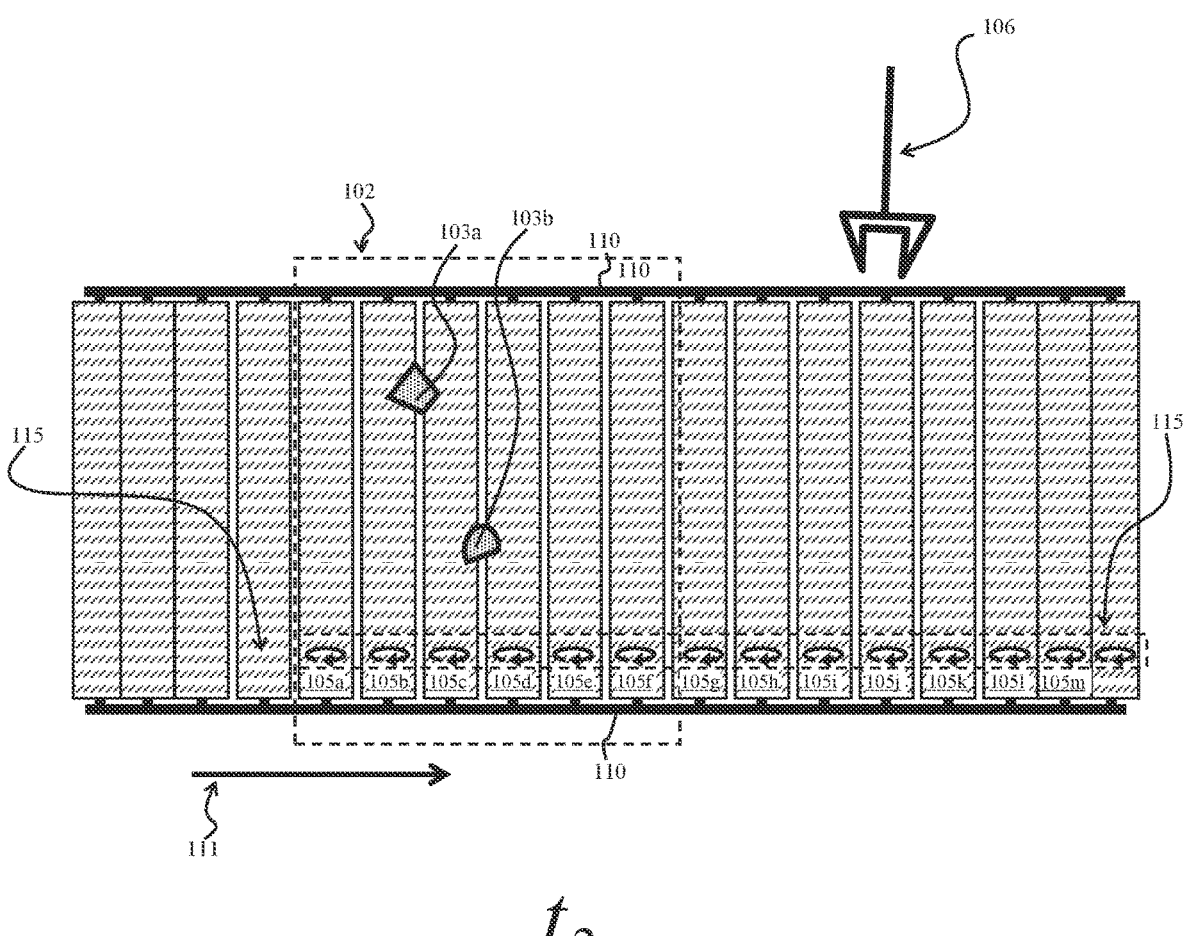
Figure 1C:
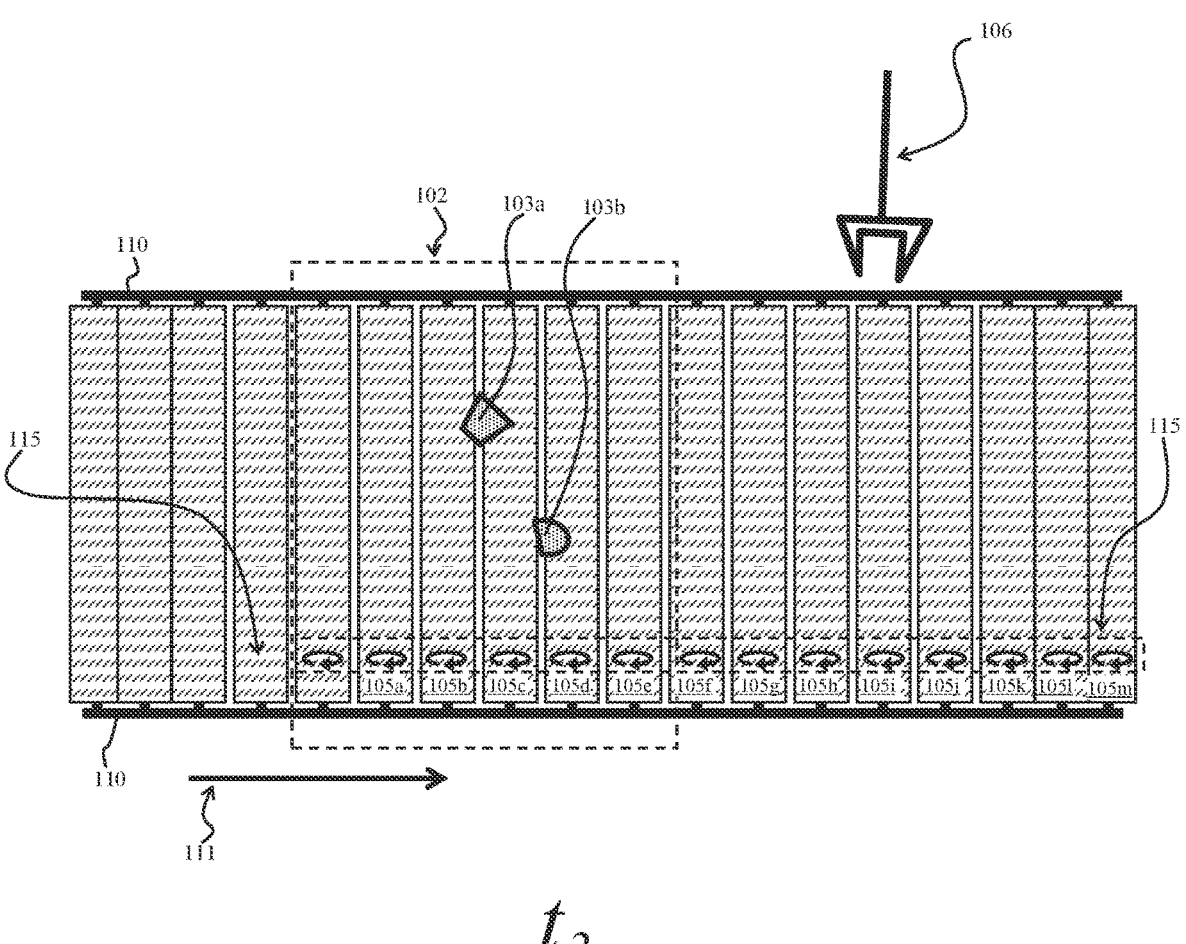
Figure 1D:
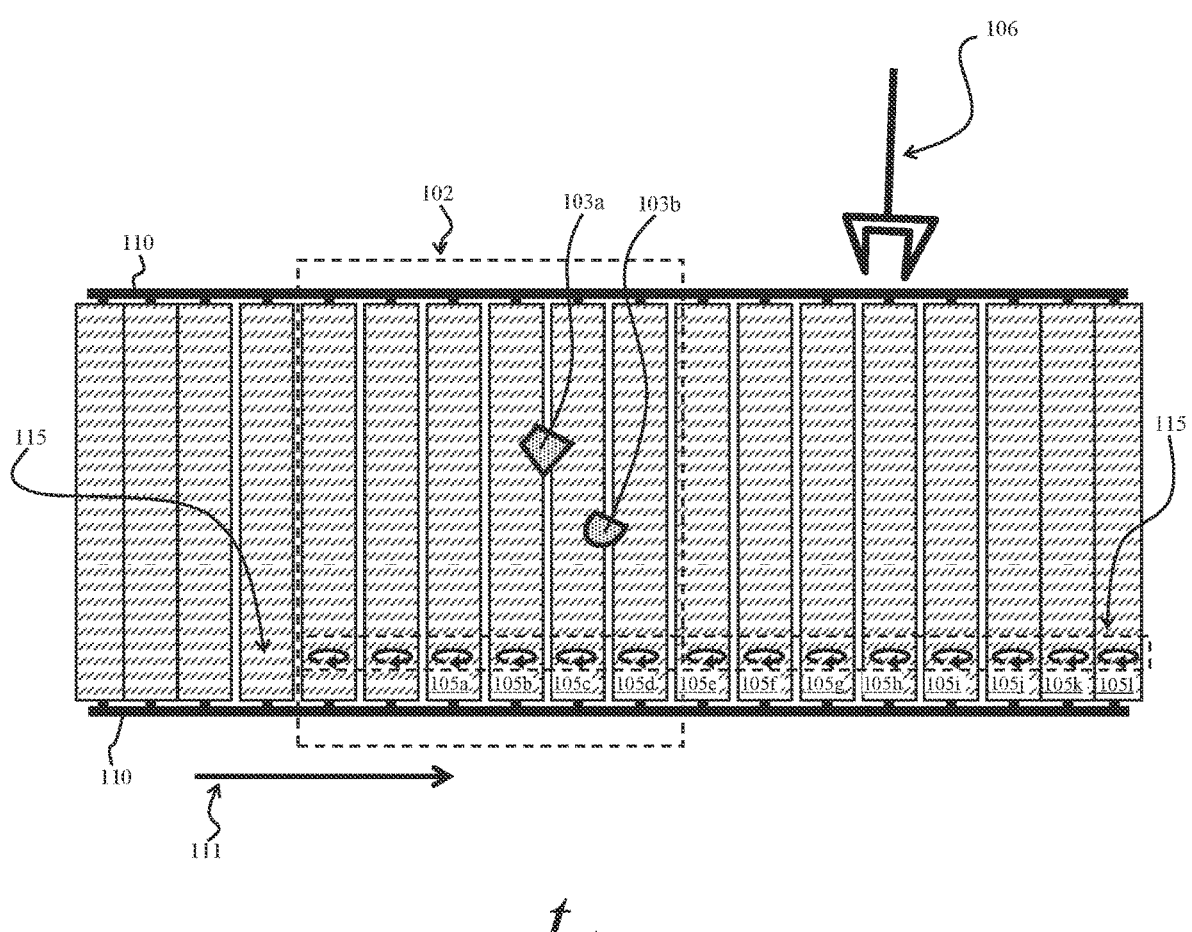
Figure 1E:
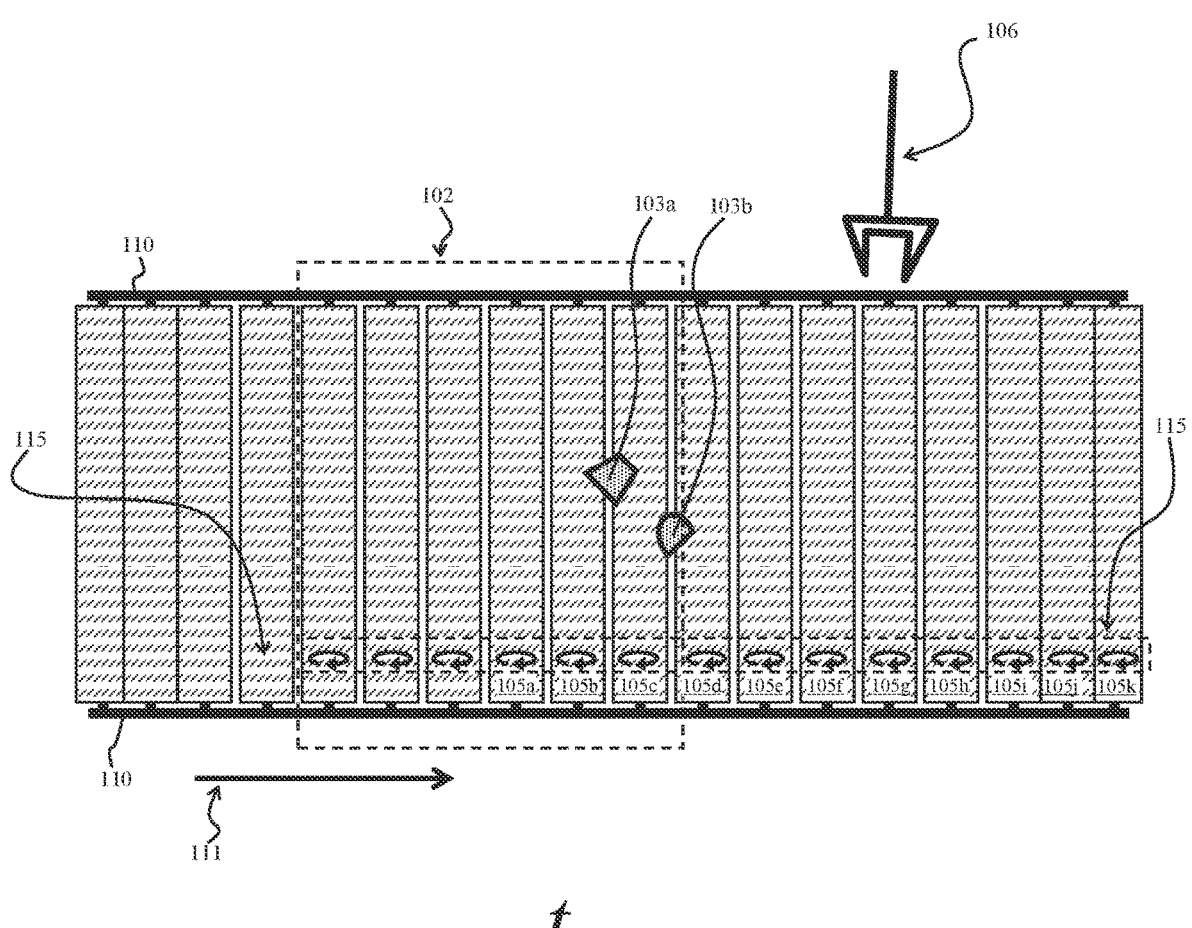
Figure 1F:
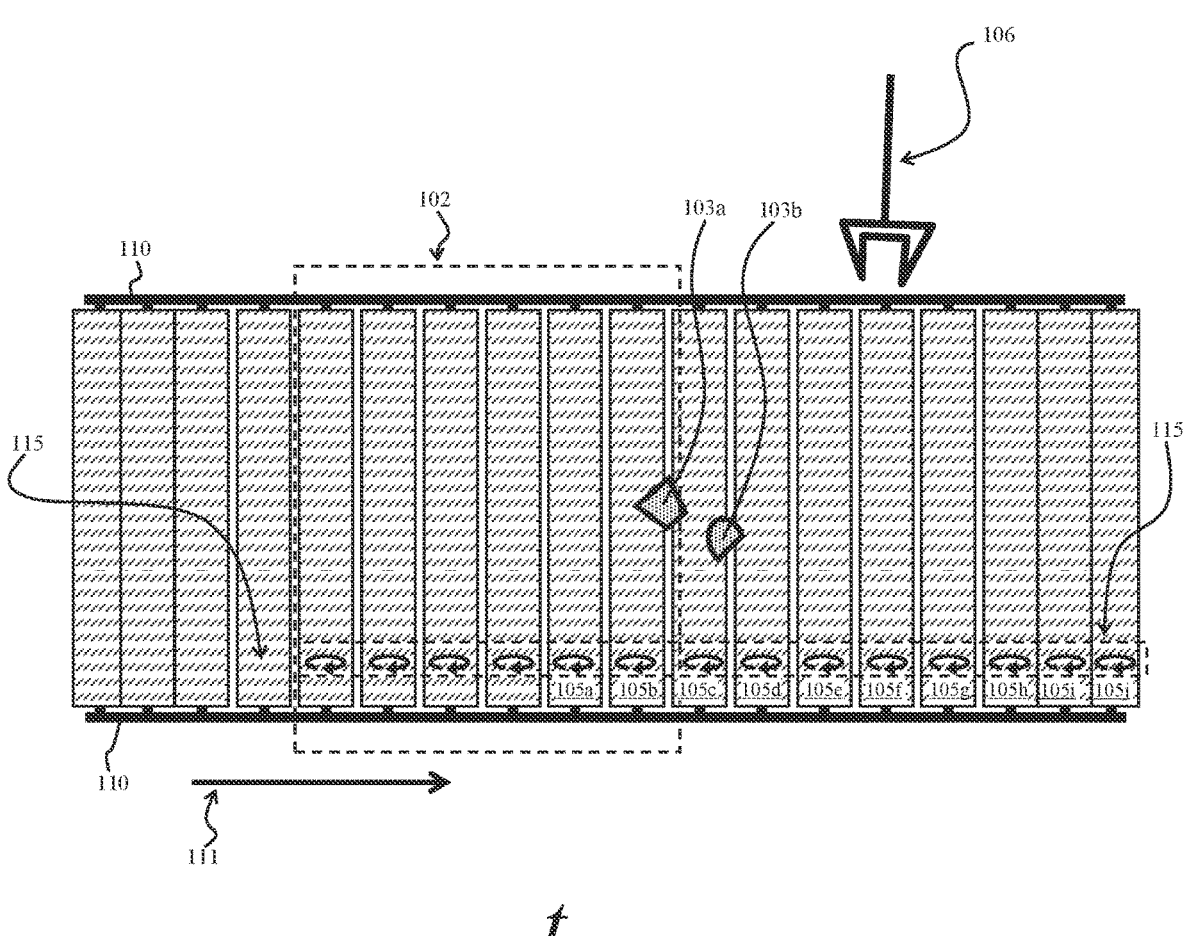
Figure 1G:
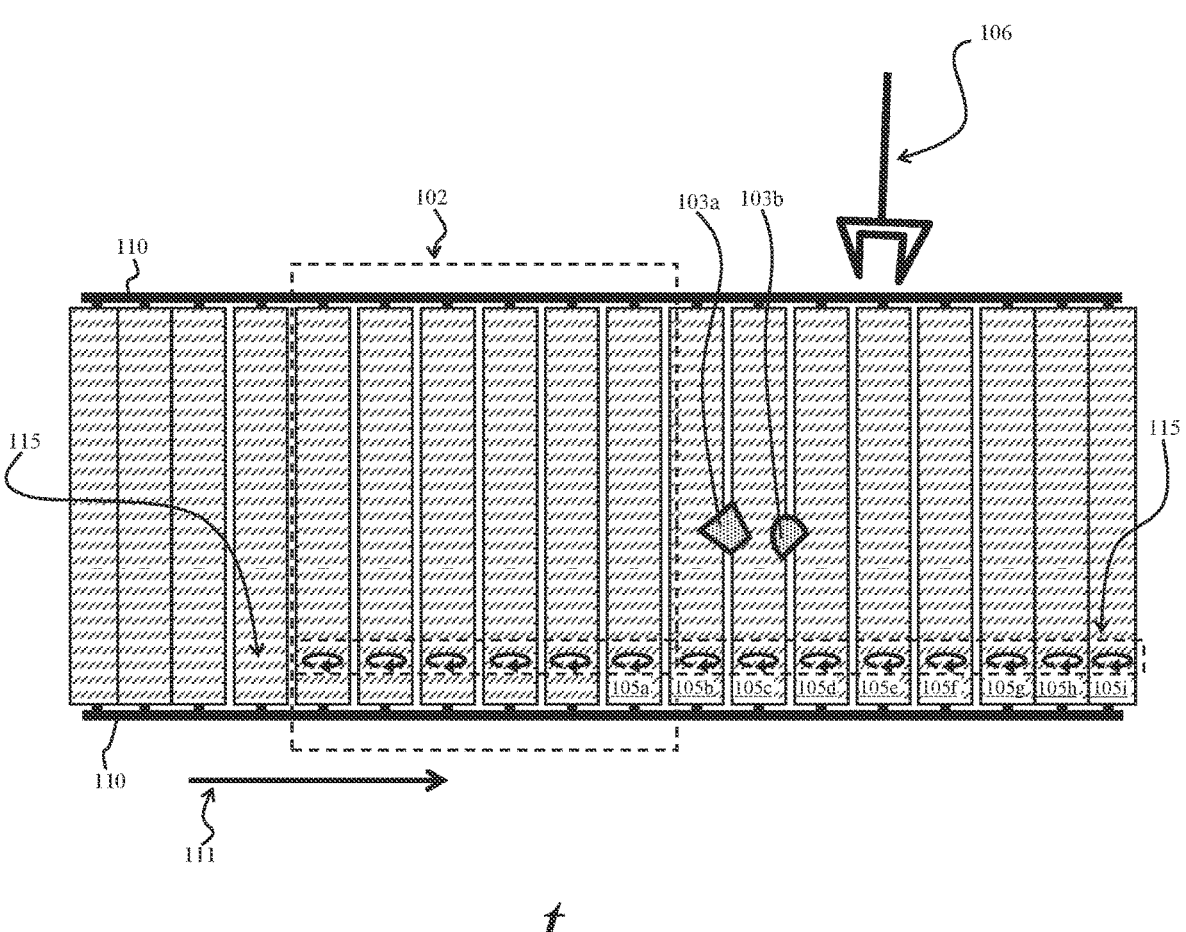
Figure 1H:
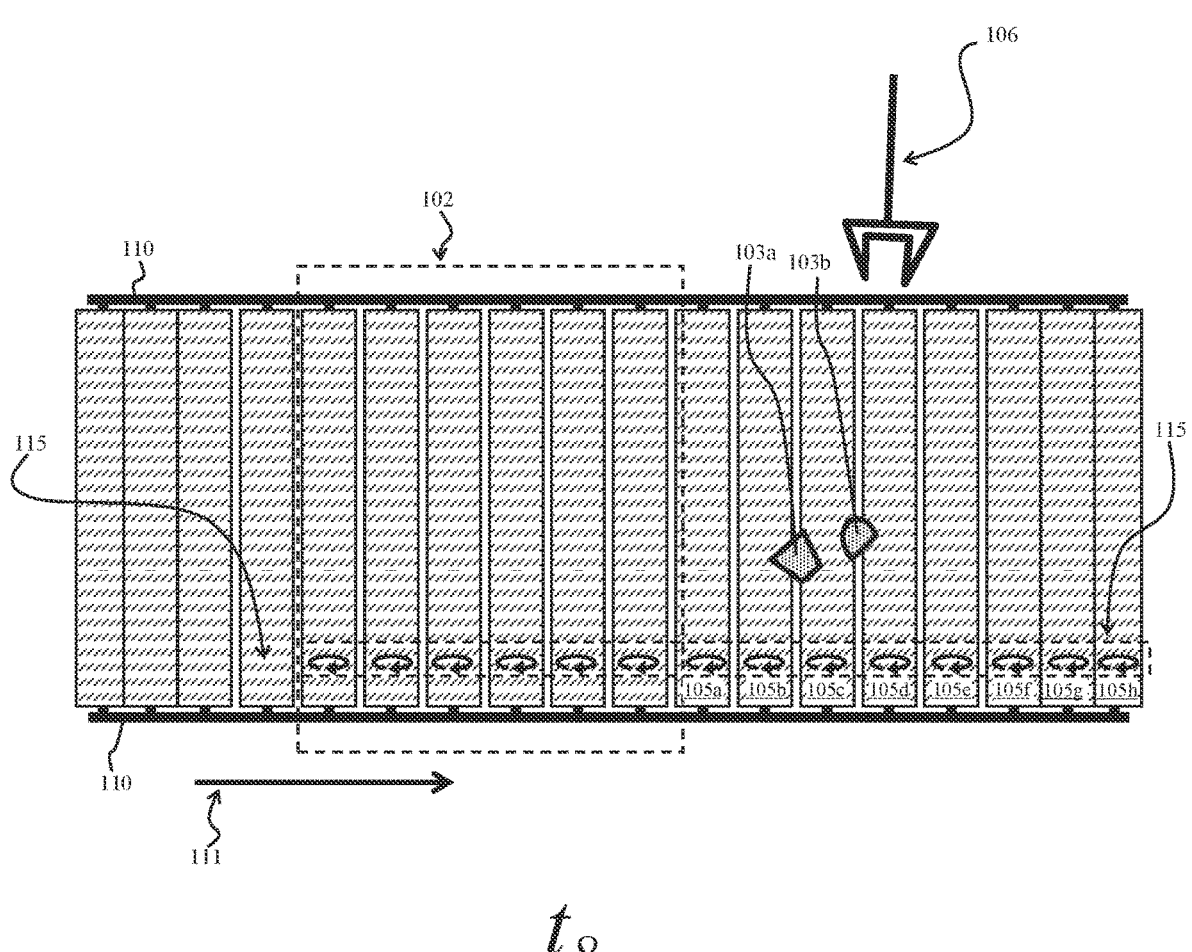
Figure 1I:
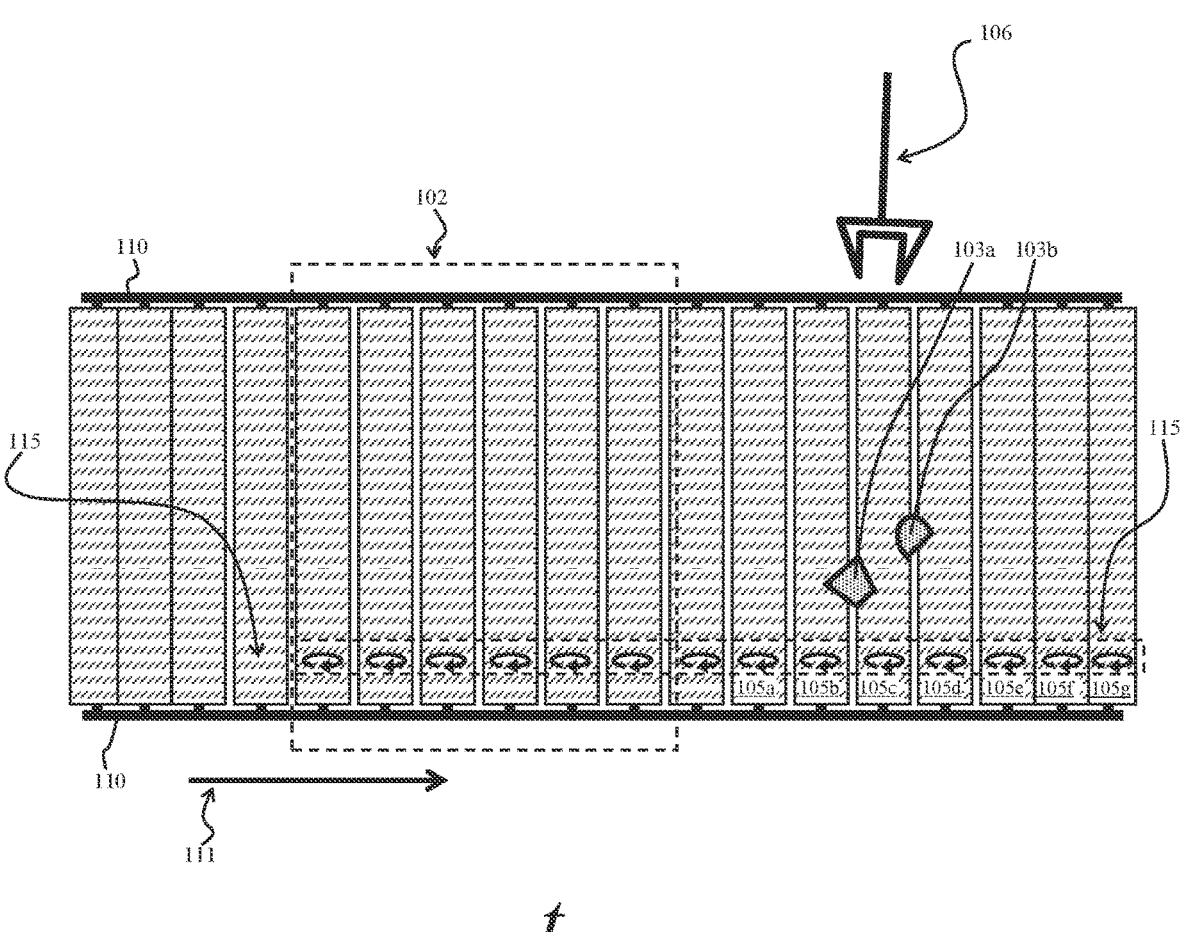
Figure 1J:
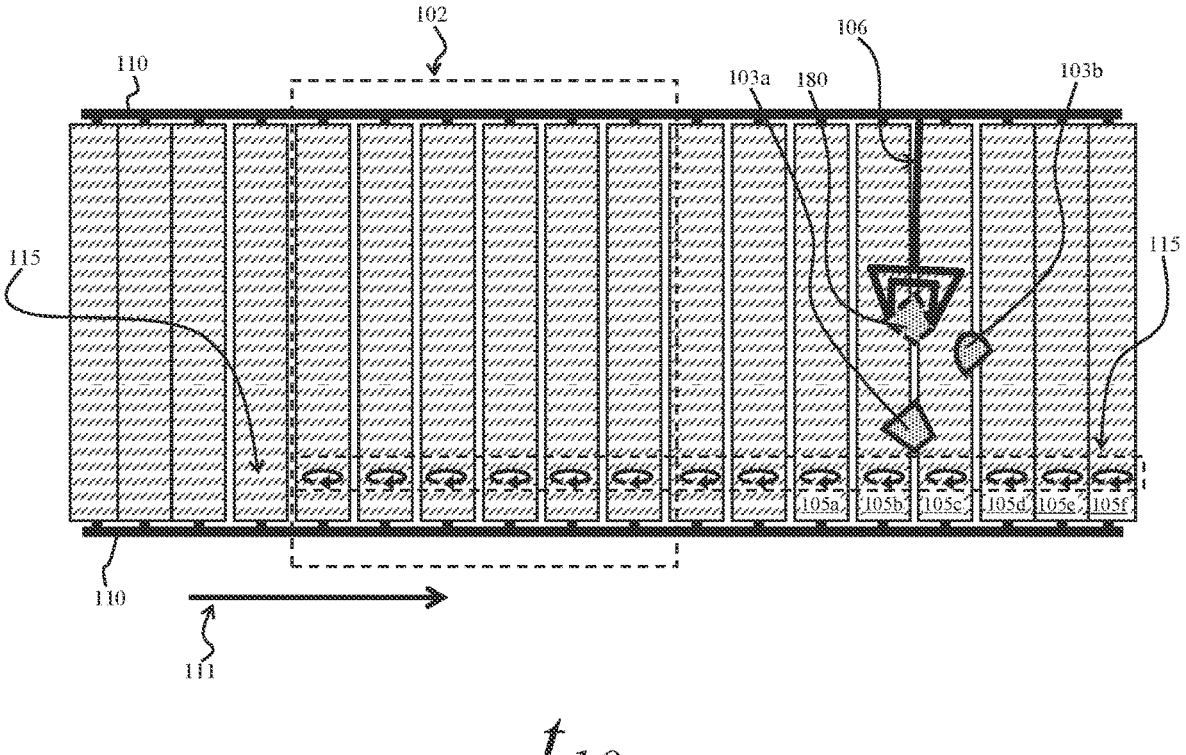
Figure 1K:
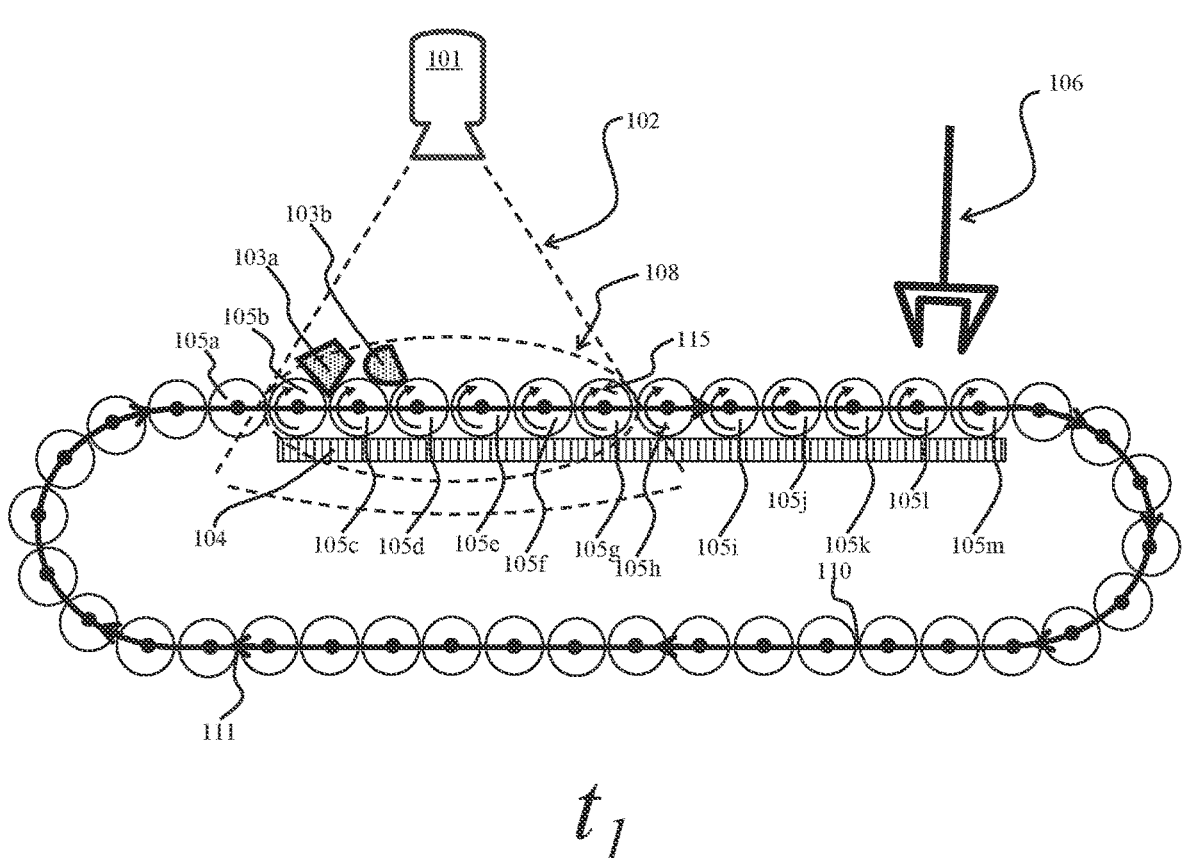
FIG. 1K shows a side view of the system and products depicted in FIG. 1A.

This Application claims priority to U.S. Provisional Application No. 63/212,496, titled "STABLE POSITIONING OF PRODUCT FOR ROBOTIC PICKING OFF ROLLER TABLE," the first inventor of which is Daniel Goodrick, filed on Jun. 18, 2021, and which is incorporated herein by reference in its entirety.

A system and method are disclosed for arresting roller rotation to avoid product drift and/or roller jumping to facilitate successful picking of a product.

Table of Reference Numbers from Drawings:

The following table is for convenience only and should not be construed to supersede any potentially inconsistent disclosure herein.

| Reference Number | Description |
| --- | --- |
| 100 | anti-drift system |
| 101 | camera |
| 102 | field of view for camera 101 |
| 103a-b | products |
| 104 | rotation inducer |
| 105a-n | rollers |
| 106 | picker |
| 108 | rollers in contact with traction bar |
| 110 | track |
| 111 | arrow indicating direction of movement of rollers along track |
| 115 | arrows indicating rotational direction of rollers |
| 150 | rotational arrestor |
| 175 | arrows indicating rotational direction of rollers |
| 180 | phantom product |
| 200 | picker system |
| 600 | method flowchart |
| 610 | method step |
| 620 | method step |
| 630 | method step |
| 640 | method step |
| 650 | method step |
| 660 | method step |
| 670 | method step |
| 680 | method step |

As shown in FIGS. 2A-3J, anti-drift/jump system 100 may comprise track 110 configured to convey rollers 105a-n in direction 111, camera 101, field of view 102 of camera 101, rotation inducer 104, picker 106, and rotation arrestor 150. FIGS. 2A-J show a side/cross section view of anti-drift/jump system 100. FIGS. 3A-J show a top-down view of anti-drift/jump system 100. FIGS. 4A-J and 5A-J show an anti-drift/jump system in which rotation arrestor 150 comprises a shortened traction bar 104, using the rotational friction of rollers 105a-n to dampen/arrest/stop rotation of rollers 105a-n.

Computer vision system 101 may be a camera or other sensor with image recognition and image processing capabilities (or other capabilities for processing captured data), and a field of view 102. Camera 101 may be mounted (at least the image capture component) above track 110 and rollers 105a-n, or in some location such that field of view 102 of camera 101 includes at least some of rollers 105a-n. In some embodiments, camera 101 may comprise multiple sensor devices that coordinate and/or work in conjunction with each other.

Robot picker arm 106 may be any robotic or automated device for picking, kicking, striking, or otherwise manipulating a product on rollers 105a-n table. Picker arm 106 may be mounted above, to the side, or otherwise within sufficient proximity of track 110 and rollers 105a-n.

Rotation inducer 104 may be any device for inducing, forcing, or compelling some or all of rollers 105a-n to roll or rotate. Rotation inducer 104 may be one or more traction bars or motors. As shown in FIGS. 2A-J and 4A-J, rotation inducer 104 may be a traction bar, which may contact and mechanically interact with rollers 105a-n as they pass traction bar 104, thereby causing rollers 105a-n to rotate in the direction as indicated by arrows 115 and 175. The spinning/rotation of rollers 105a-n results in rolling and/or re-orientation of products 103a and 103b while in camera 101's field of view 102, thereby allowing camera 101 to image and inspect products 103a and 103b from multiple angles and at multiple orientations.

As shown in FIGS. 2A-3J, a rotational arrestor 150 may arrest, stop, and or dampen rotation of one or more rollers while the product supported by such roller(s) is still in field of view 102 of camera 101 or shortly after the product has supported by such rollers has exited field of view 102 of camera 101. Rotational arrestor 150 may comprise one, or a combination of, many different mechanical systems, e.g., friction, brakes, and/or motors.

In another embodiment, the rotational arrestor may rely on the rotational friction of the rollers such that dampening, arresting, and/or stopping rotation of the rollers is accomplished by not inducing rotation instead of by affirmatively stopping or braking the rotation. For example, as shown in FIGS. 4A-5J, the rotational arrestor may comprise a shortened traction bar 104 that does not interact with rollers 105a-n in a manner to induce rolling in the section of track 110 between the edge of field of view 102 and the location of potential picking by picker 106. In this embodiment, the length/extent of traction bar 104 may be determined based on the location(s) at which camera 101 will capture image(s) of a product such that rotation of rollers 105a-n stops sufficiently soon after exiting field of view 102 so that potential shifting or jumping is within acceptable tolerances.

In some embodiments, the rotation/spinning of a roller 105n may stop completely while a supported product is still in (in completely or partially) camera 101's field of view 102. In other embodiments, rotation/spinning of roller 105n may be limited to acceptable tolerances to prevent, or significantly decrease the likelihood of, significant drifting and/or jumping of products 103a and 103b that may result in an inaccurate predicted location for picking by robot arm 106.

As a point of clarification, the significant location for discontinuing (completely or partially) roller spinning is not necessarily the edge of camera 101's field of view 102, but is, more accurately, determined based on the product location at which camera 101 captures some image or data that will be used to predict the product's subsequent location for picking.

FIGS. 2A-5J show an exemplary embodiment of the anti-drift/jump system 100. FIGS. 2A-J and 4A-J correspond with FIGS. 3A-J and 5A-J, respectively, and represent different views of the same system at times $t_1$-$t_{10}$. FIGS. 2A-J and 4A-J are side/cross-section views. FIGS. 3A-J and 5A-J are top-down views.

All references below to FIGS. 2A-J apply similarly to FIGS. 4A-J, except that FIGS. 4A-J do not include an affirmative rotational arrestor 150. All references below to FIGS. 3A-J apply similarly to FIGS. 5A-J, except that FIGS. 5A-J do not include an affirmative rotational arrestor 150.

Figure 2A:
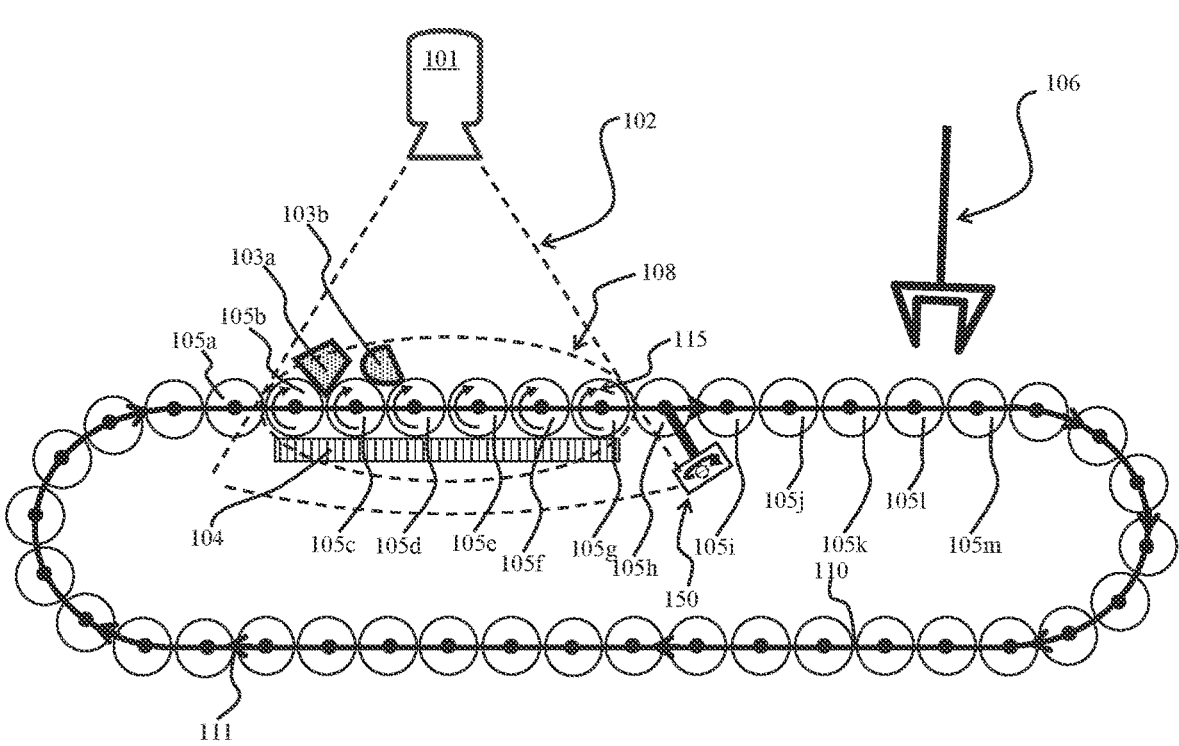
FIGS. 2A-J show side-view-perspective time snapshots of an exemplary system as described herein.
Figure 2B:
Figure 2B:
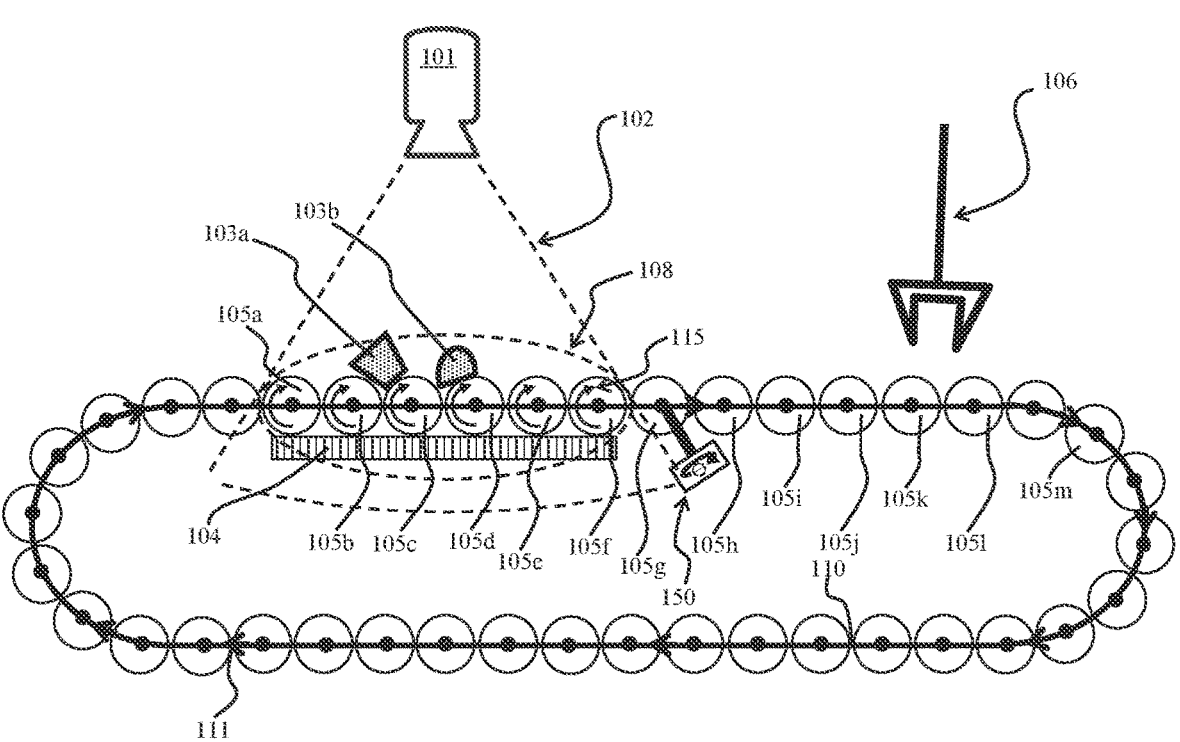
Figure 2C:
Figure 2C:
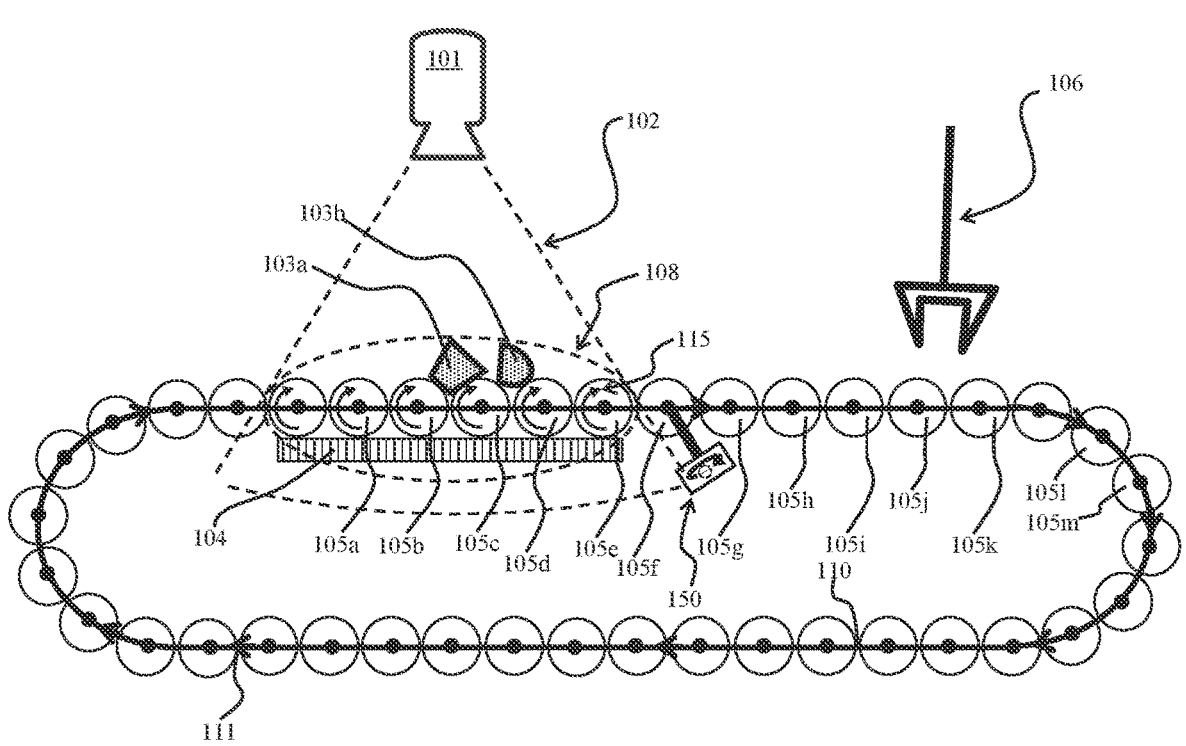
Figure 2D:
Figure 2D:
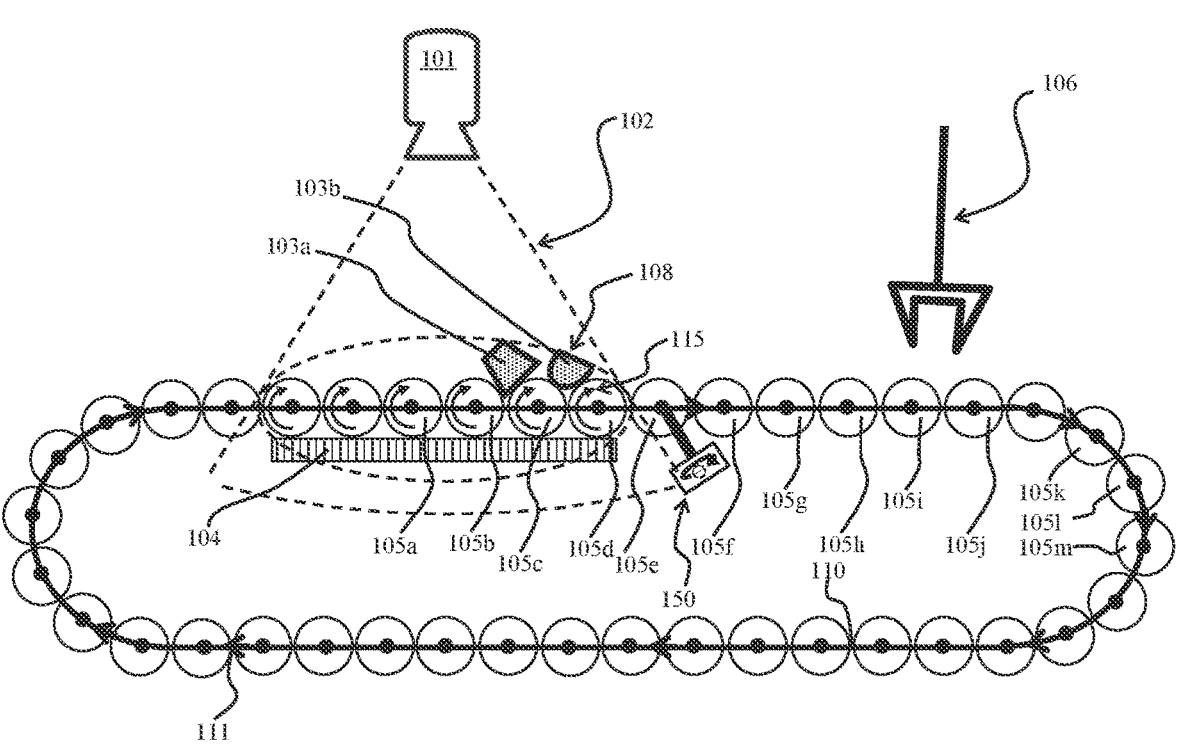
Figure 2E:
Figure 2E:
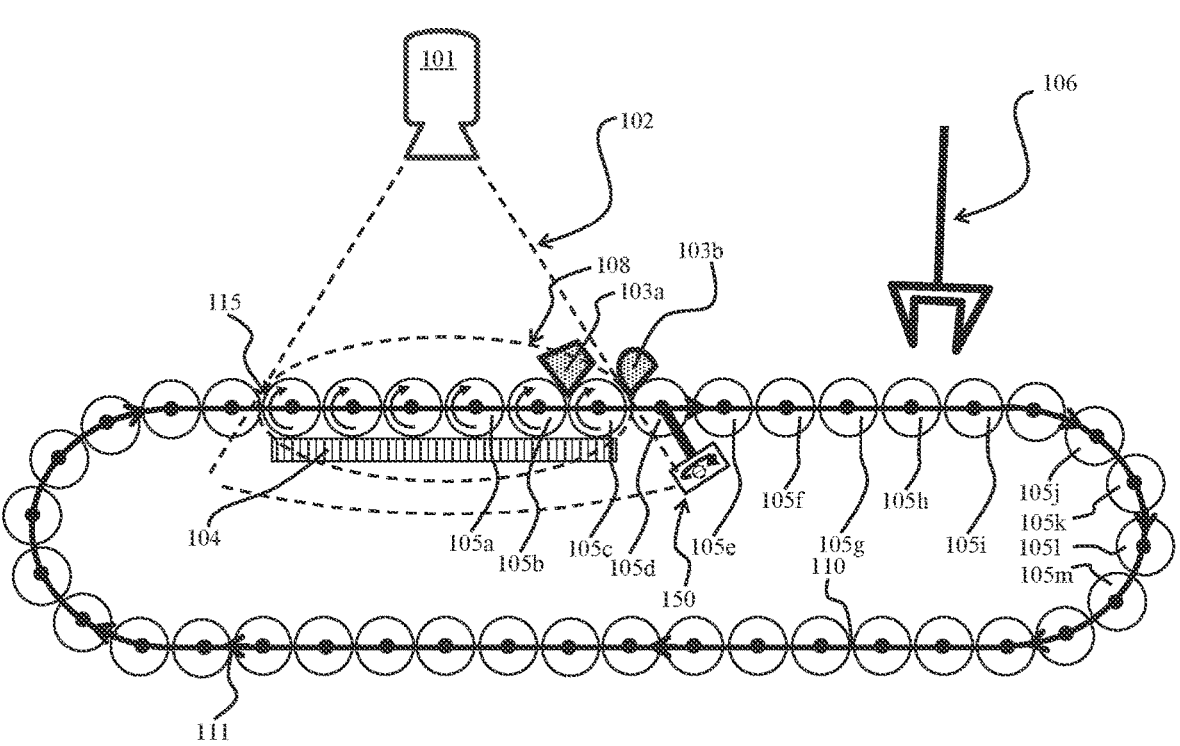
Figure 2F:
Figure 2F:
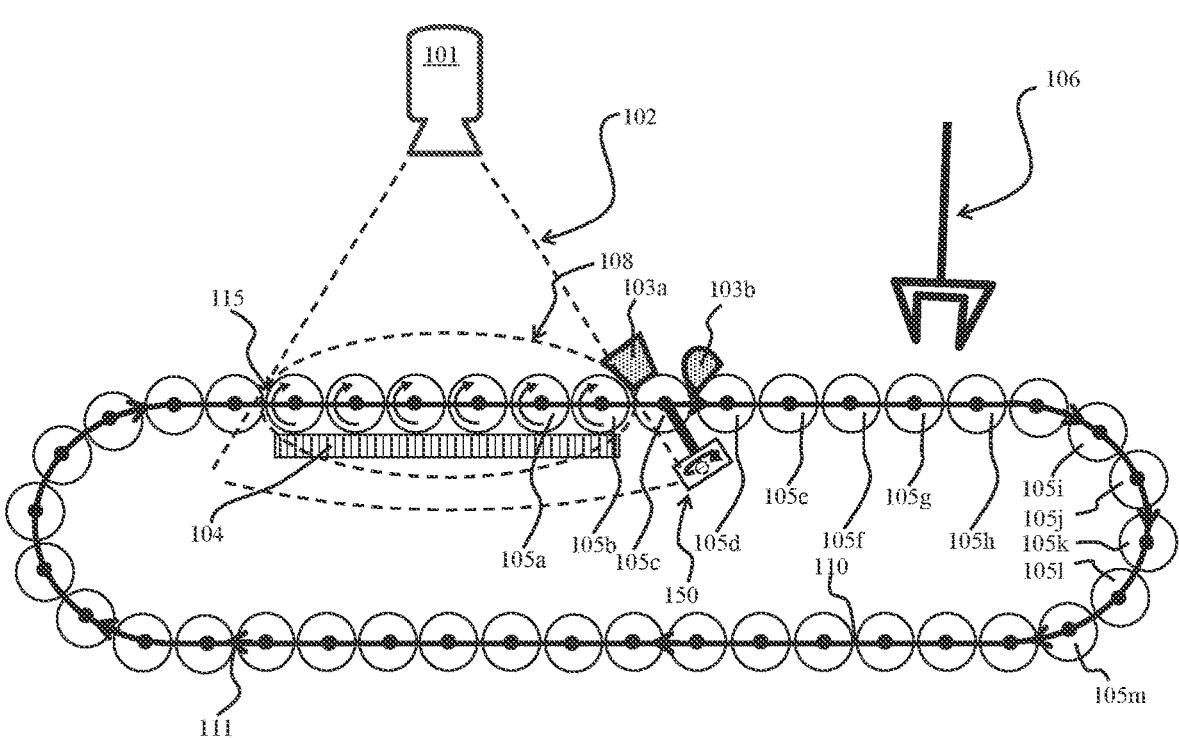
Figure 2G:
Figure 2G:
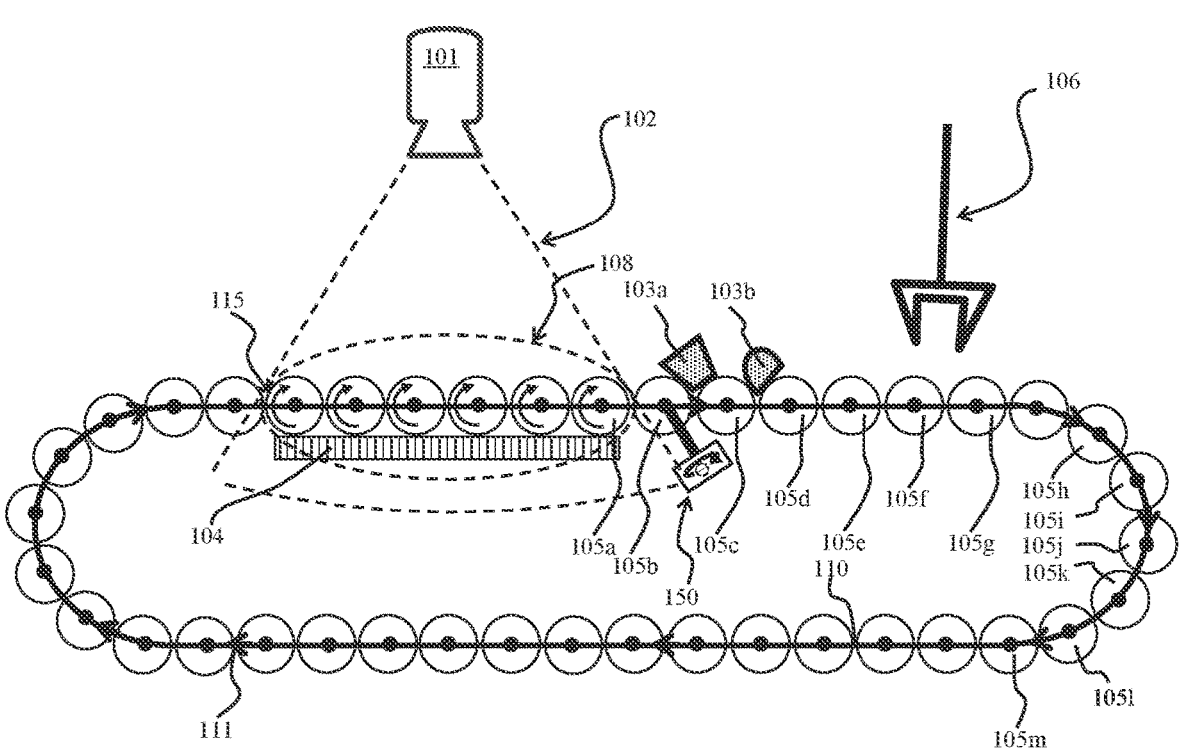
Figure 2H:
Figure 2H:
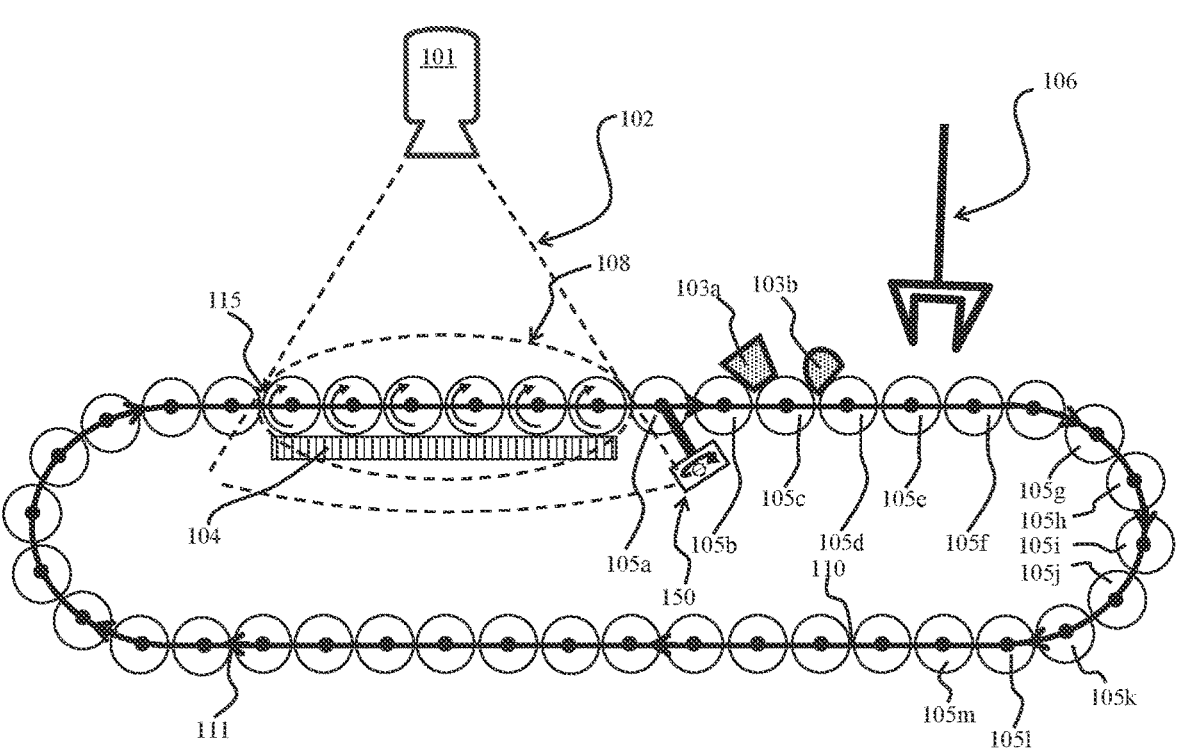
Figure 2I:
Figure 2I:
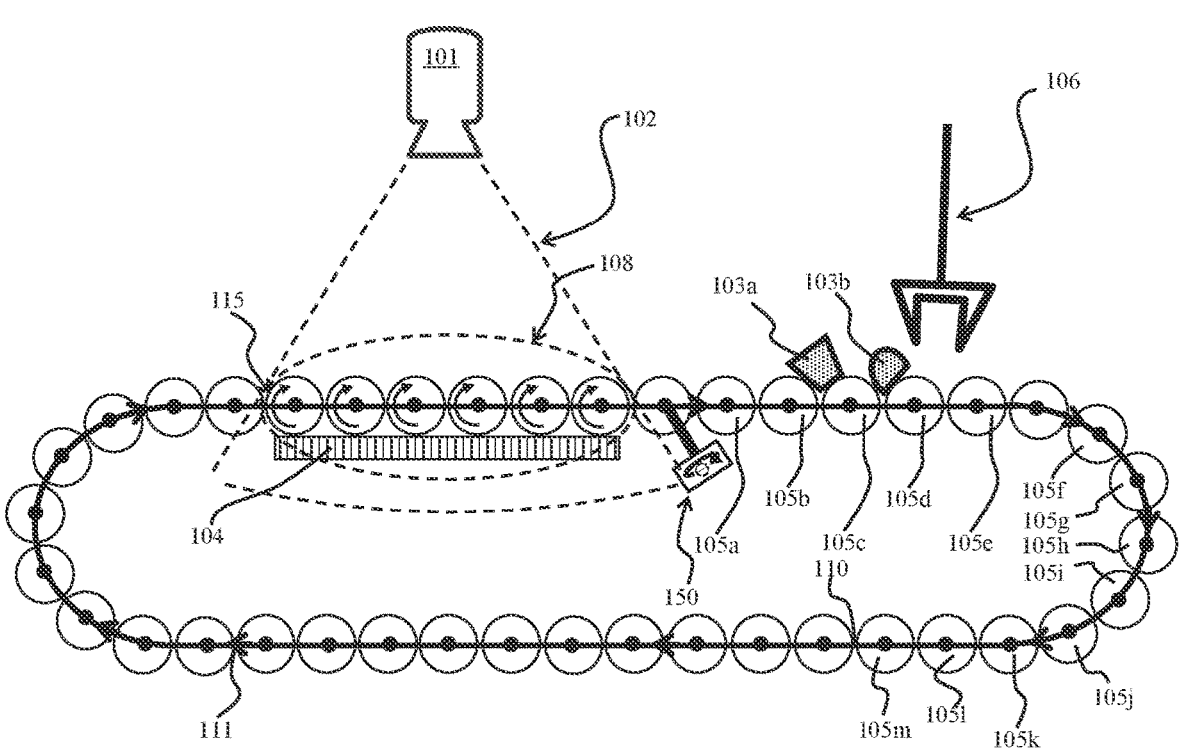
Figure 2J:
Figure 2J:
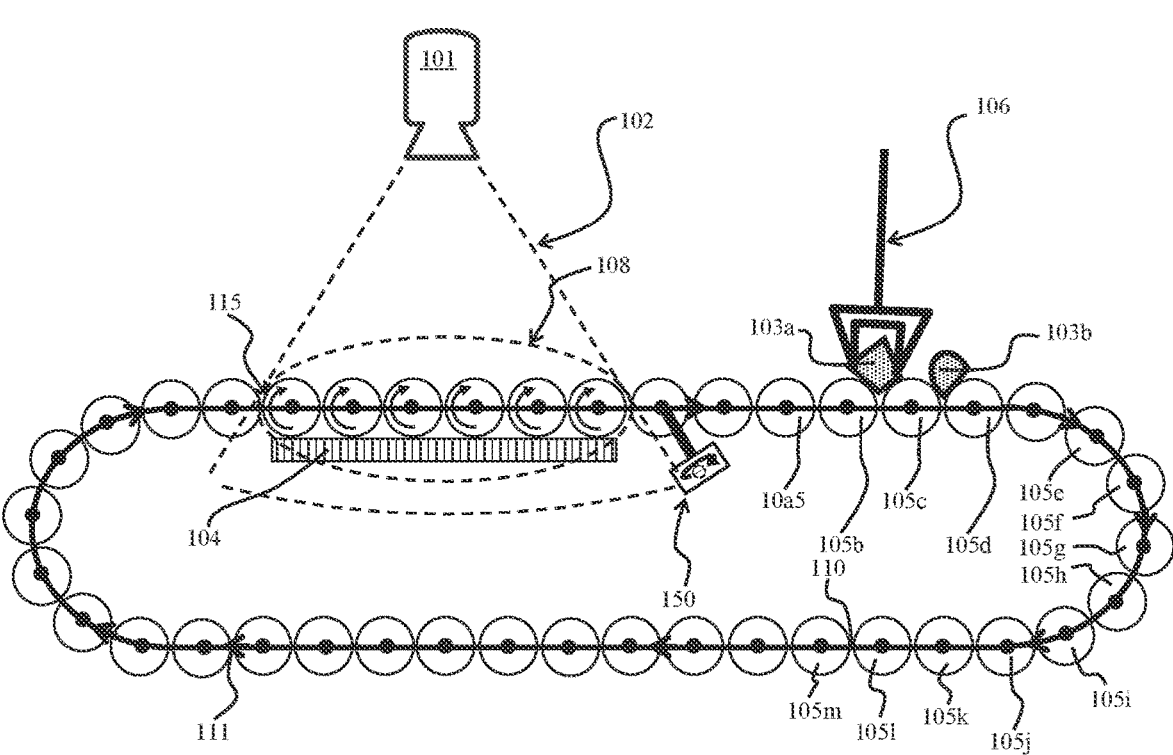
Figure 3A:
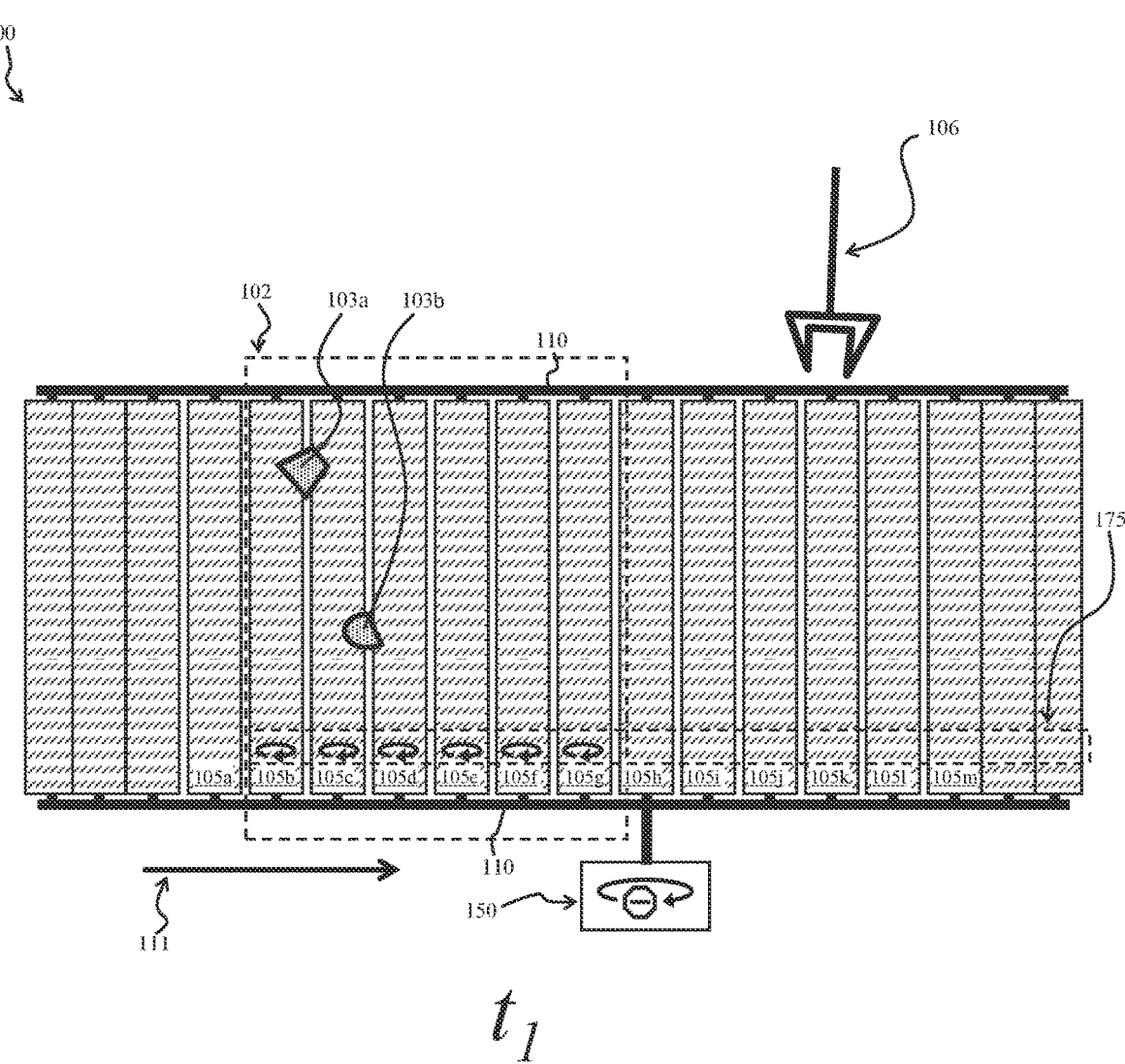
FIGS. 3A-J show overhead-perspective time snapshots of an exemplary system as described herein.

As shown in FIGS. 2A and 3A, at time $t_1$, track 110 is moving rollers 105*a-n* in direction 111. At time $t_1$, rollers 105*b-g* are in field of view 102 of camera 101. Additionally, as shown in FIG. 2A, traction bar 104 is causing rollers 105*b-g* to rotate in direction 115 (FIGS. 2A-J)/175 (FIGS. 3A-J). Additionally, as shown in FIGS. 2A-3J, rotational arrestor 150 is arresting the rotation of the roller at the boundary of view 102. In FIGS. 2A and 3A, rotational arrestor 150 is arresting the rotation of roller 105*h*. At time $t_1$, products 103*a* and 103*b* are in the respective locations shown in FIGS. 2A and 3A. More specifically, product 103*a* is between rollers 105*b* and 105*c*, and product 103*b* is between rollers 105*c* and 105*d*. Because rollers 105*b*, 105*c*, and 105*d* are rotating, products 103*a* and 103*b* are also rotating, tumbling, and/or rolling.

Figure 3B:
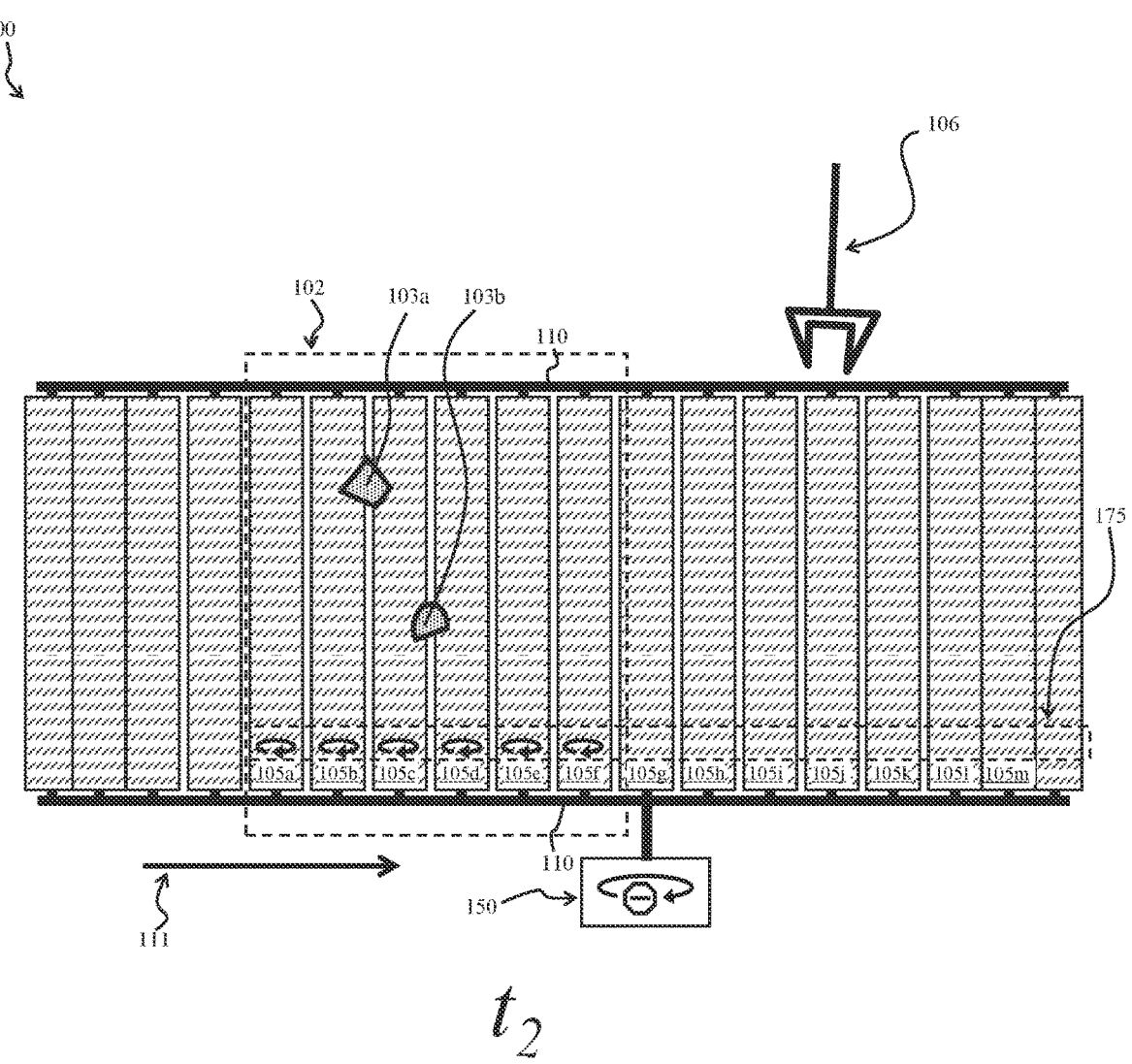

As shown in FIGS. 2B and 3B, at time $t_2$ product 103*a* has been re-oriented since time $t_1$ (e.g., by rotating, tumbling, and/or rolling), remains between rollers 105*b* and 105*c*, and has moved in direction 111 as carried by rollers 105*b* and 105*c*. At time $t_2$ product 103*b* has been re-oriented since time $t_1$ (e.g., by rotating, tumbling, and/or rolling), remains between rollers 105*c* and 105*d*, and has moved in direction 111 as carried by rollers 105*c* and 105*d*. At time $t_2$ products 103*a* and 103*b* are both in field of view 102. Because of product 103*a*'s shape, topography, weight distribution, and/or other features, when product 103*a* rolls as a result of the rotation of rollers 105*b* and 105*c*, product 103*a* also drifts along the boundary between rollers 105*b* and 105*c*. FIGS. 3A-F show that product 103*a* is drifting downward (toward the bottom of the page/drawing) from times $t_1$-$t_6$.

Figure 3C:
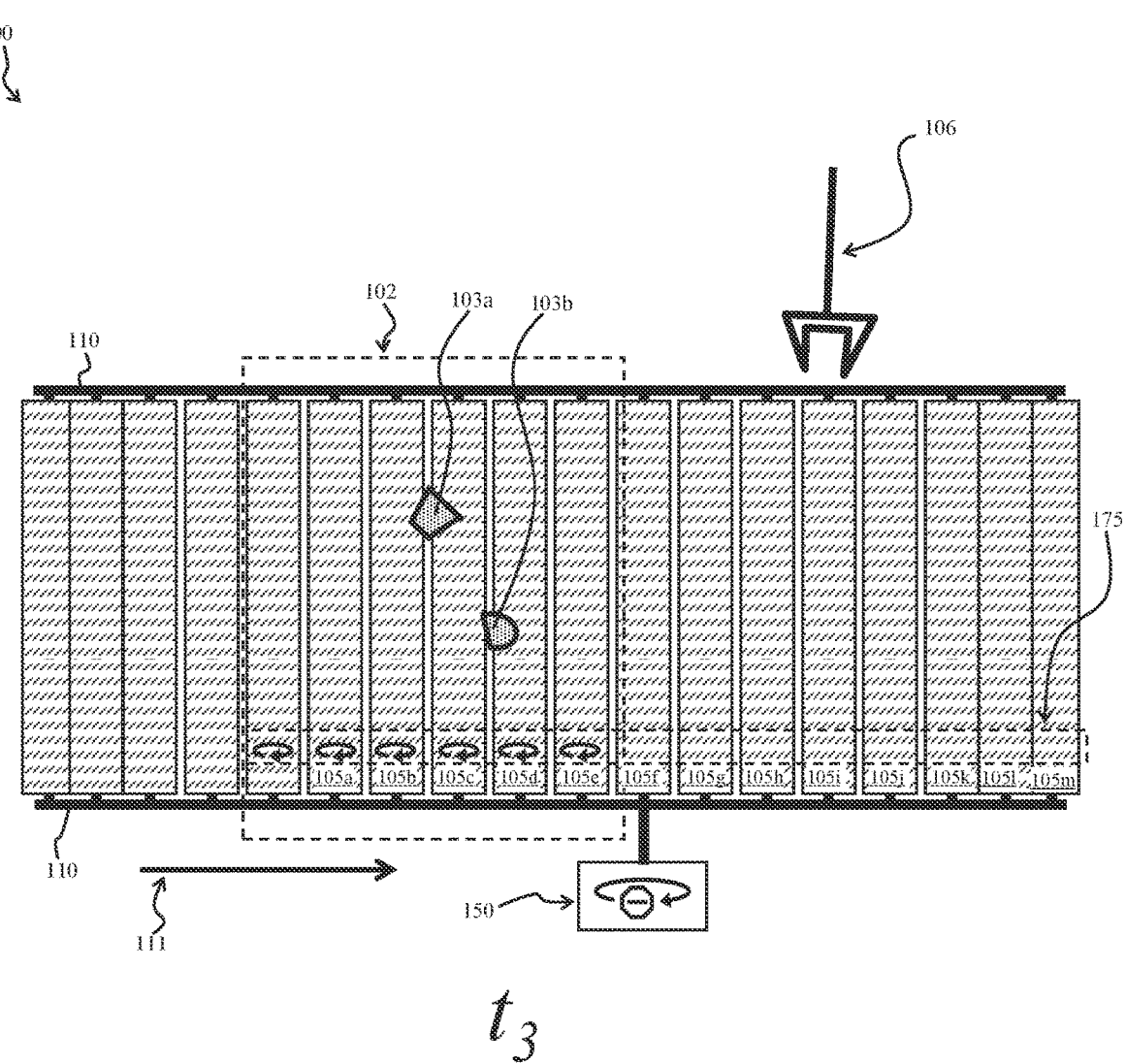

As shown in FIGS. 2C and 3C, at time $t_3$ product 103*a* has been re-oriented since time $t_2$ (e.g., by rotating, tumbling, and/or rolling), remains between rollers 105*b* and 105*c*, and has moved in direction 111 as carried by rollers 105*b* and 105*c*. At time $t_3$ product 103*b* has been re-oriented since time $t_2$ (e.g., by rotating, tumbling, and/or rolling), remains between rollers 105*c* and 105*d*, and has moved in direction 111 as carried by rollers 105*c* and 105*d*. At time $t_3$ products 103*a* and 103*b* are both in field of view 102. At time $t_3$ product 103*a* has drifted downward since time $t_2$.

Figure 3D:
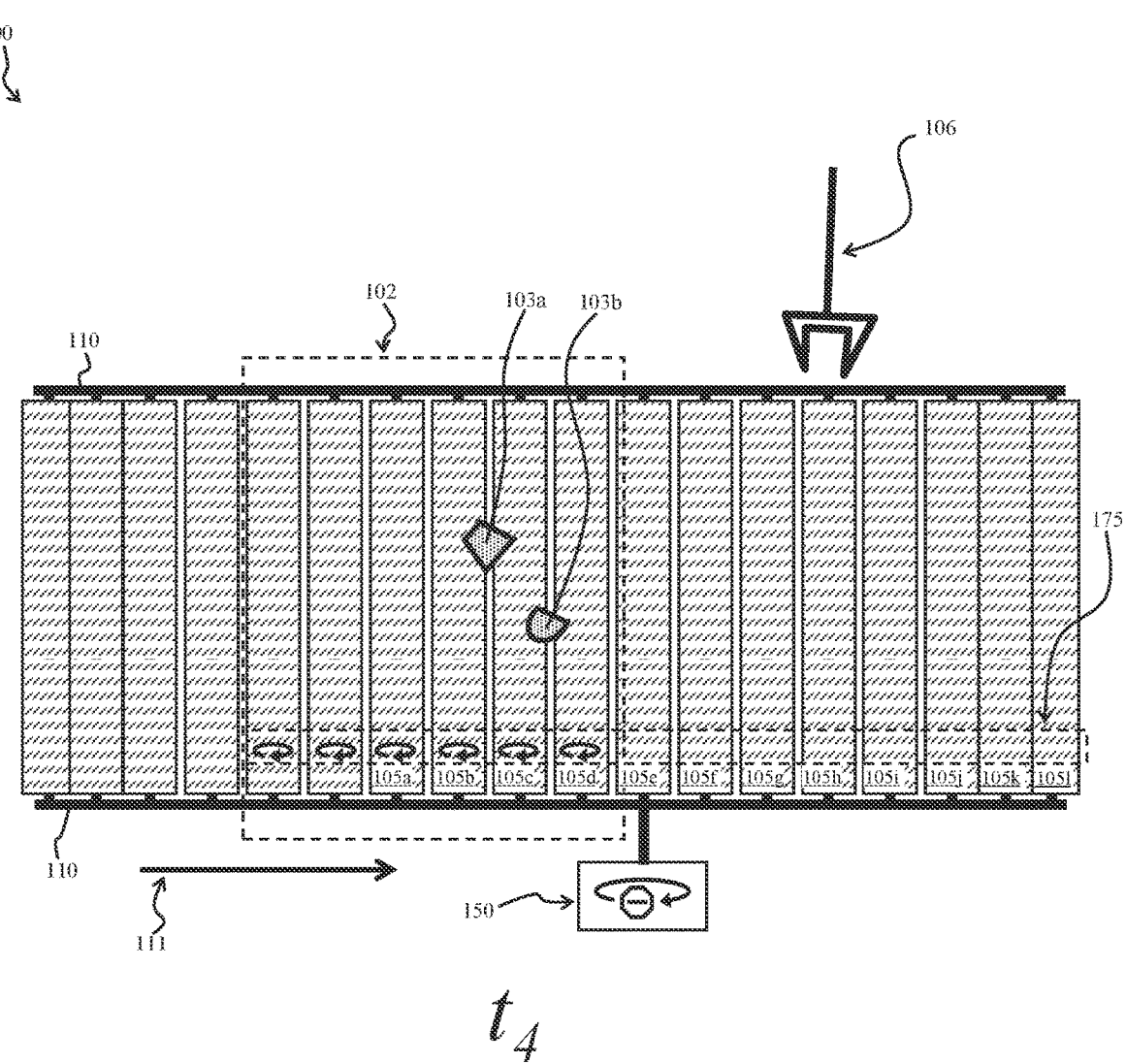

As shown in FIGS. 2D and 3D, at time t product 103*a* has been re-oriented since time $t_3$ (e.g., by rotating, tumbling, and/or rolling), remains between rollers 105*b* and 105*c*, and has moved in direction 111 as carried by rollers 105*b* and 105*c*. At time $t_4$ product 103*b* has been re-oriented since time $t_3$ (e.g., by rotating, tumbling, and/or rolling), remains between rollers 105*c* and 105*d*, and has moved in direction 111 as carried by rollers 105*c* and 105*d*. At time $t_4$ products 103*a* and 103*b* are both in field of view 102. At time $t_4$ product 103*a* has drifted downward since time $t_3$.

Figure 3E:
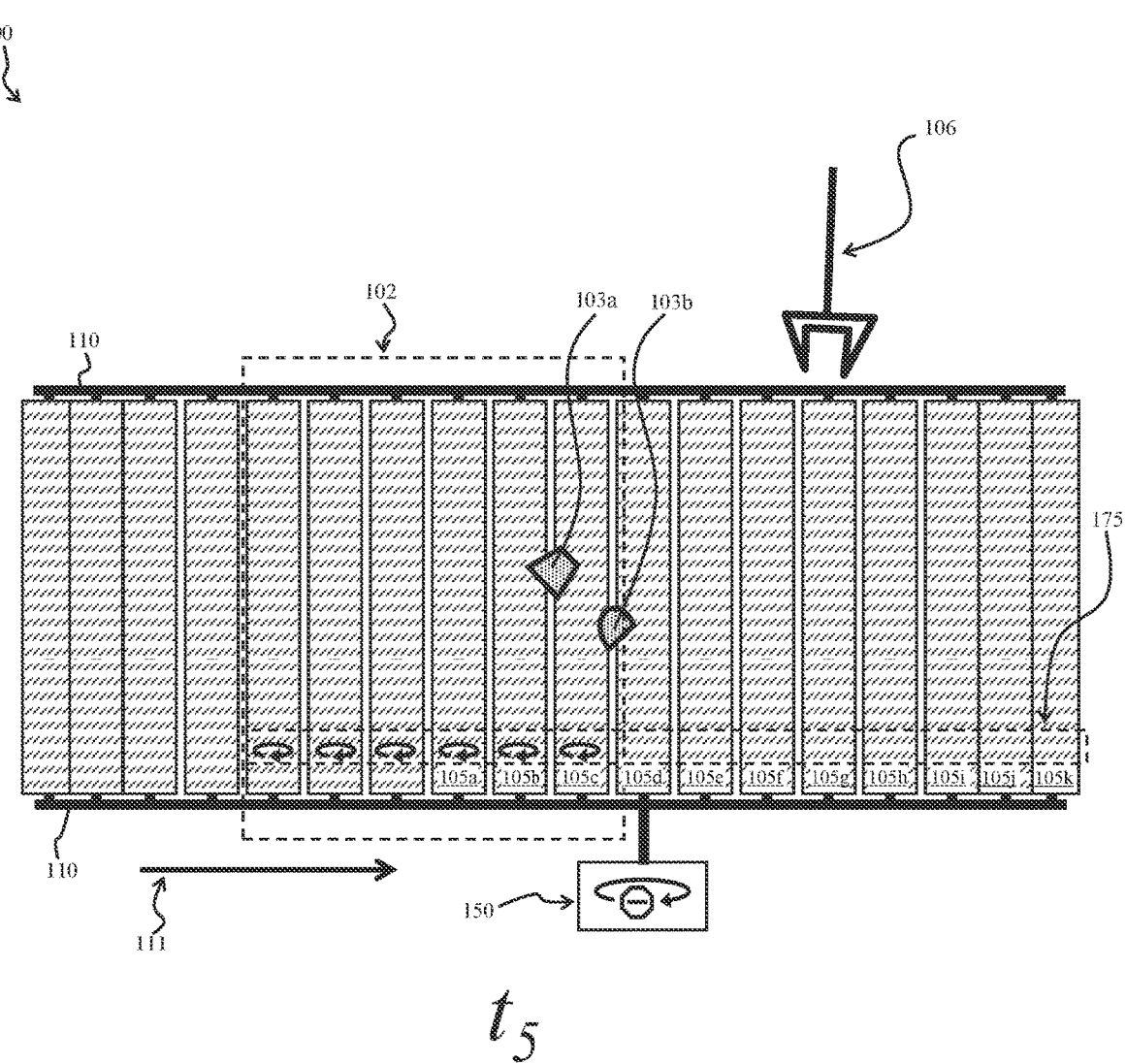

As shown in FIGS. 2E and 3E, at time is product 103*a* has been re-oriented since time $t_4$ (e.g., by rotating, tumbling, and/or rolling), remains between rollers 105*b* and 105*c*, and has moved in direction 111 as carried by rollers 105*b* and 105*c*. At time is product 103*b* has been re-oriented since time $t_4$ (e.g., by rotating, tumbling, and/or rolling), remains between rollers 105*c* and 105*d*, and has moved in direction 111 as carried by rollers 105*c* and 105*d*. At time is product 103*a* remains in field of view 102 but product 103*b* is no longer in field of view 102. Additionally, at time $t_5$ rotation arrestor 150 has arrested the rotation of roller 105*d*, which is one of rollers supporting product 103*b*. At time $t_5$ product 103*a* has drifted downward since time $t_4$.

Figure 3F:
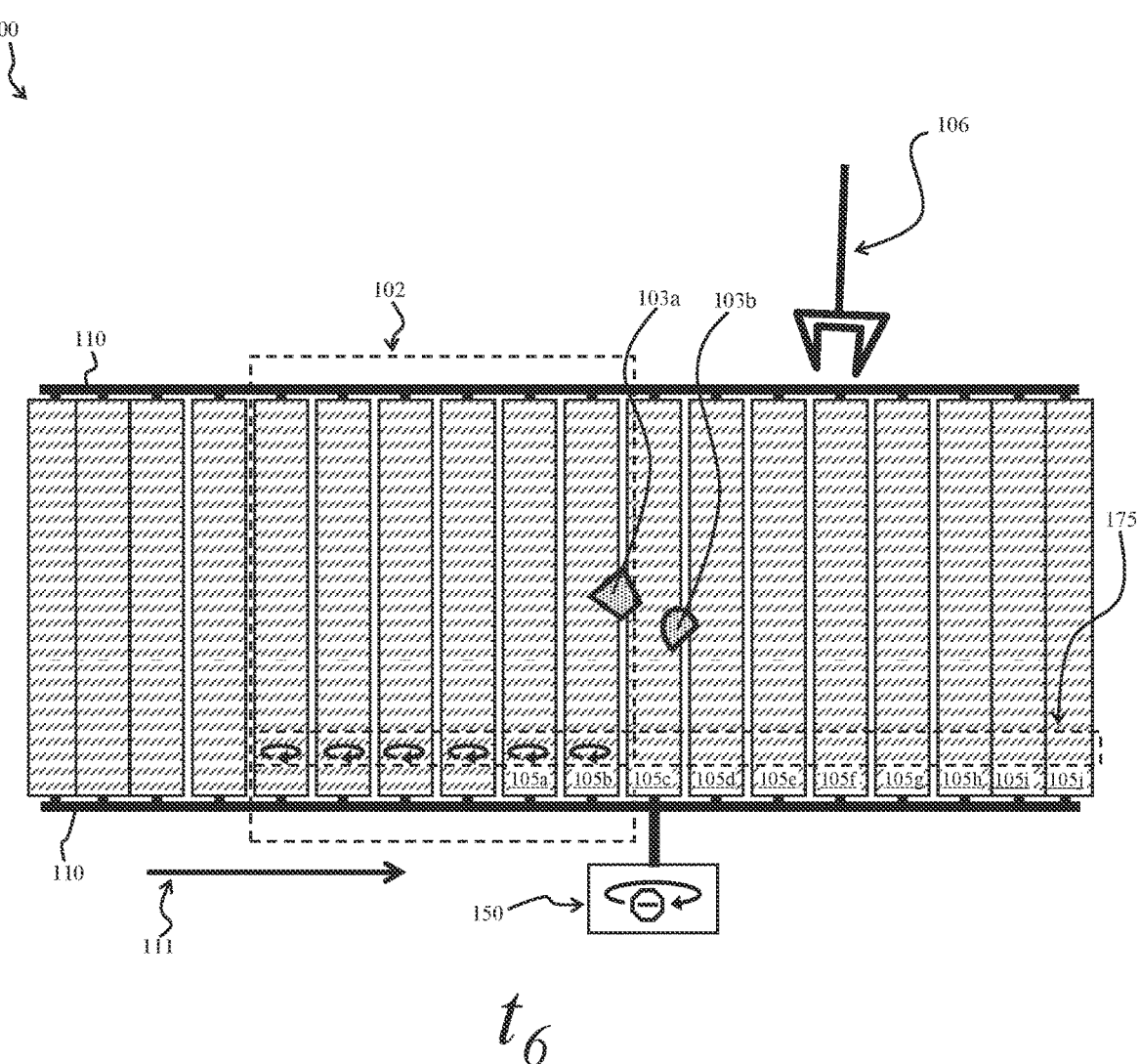

As shown in FIGS. 2F and 3F, at time $t_6$ product 103*a* has been re-oriented since time $t_5$ (e.g., by rotating, tumbling, and/or rolling), remains between rollers 105*b* and 105*c*, and has moved in direction 111 as carried by rollers 105*b* and 105*c*. At time is product 103*a* has drifted downward since time $t_5$. At time $t_6$ rotation of rollers 105*c* and 105*d* has been arrested by rotation arrestor 150. At time $t_6$ product 103*b* has not been re-oriented since time is because rotation of rollers 105*c* and 105*d* has been arrested. Product 103*b* remains between rollers 105*c* and 105*d* and has moved in direction 111 as carried by rollers 105*c* and 105*d*.

Figure 3G:
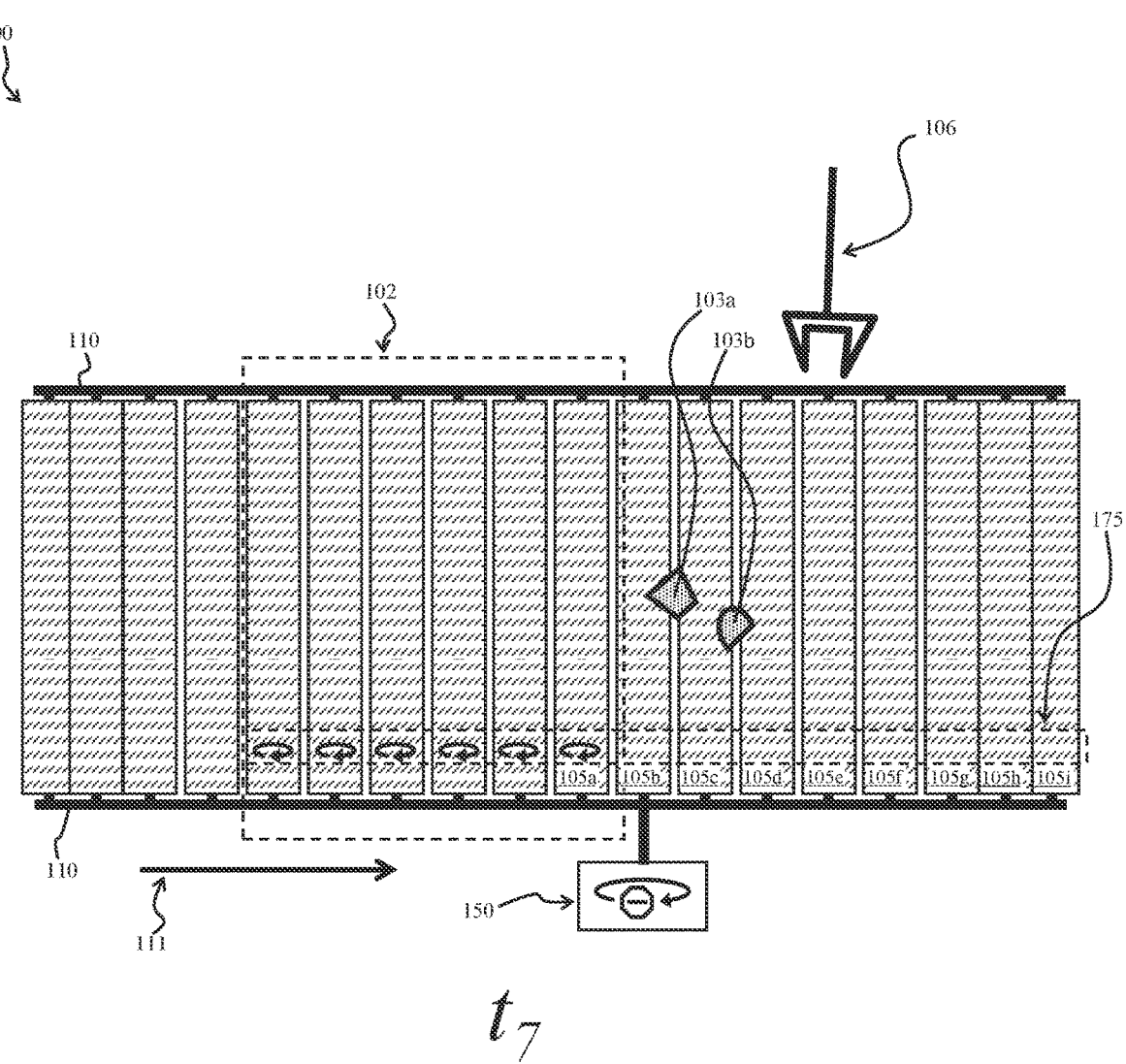

As shown in FIGS. 2G and 3G, at time $t_7$ neither of products 103*a* and 103*b* has been re-oriented since time $t_6$ because rotation of rollers 105*b*, 105*c*, and 105*d* has been arrested by rotation arrestor 150. Because product 103*a* has not rotated since time $t_6$, it has also not drifted since time $t_6$. Product 103*a* remains between rollers 105*b* and 105*c* and has moved in direction 111 as carried by rollers 105*b* and 105*c*. Product 103*b* remains between rollers 105*c* and 105*d* and has moved in direction 111 as carried by rollers 105*c* and 105*d*.

Figure 3H:
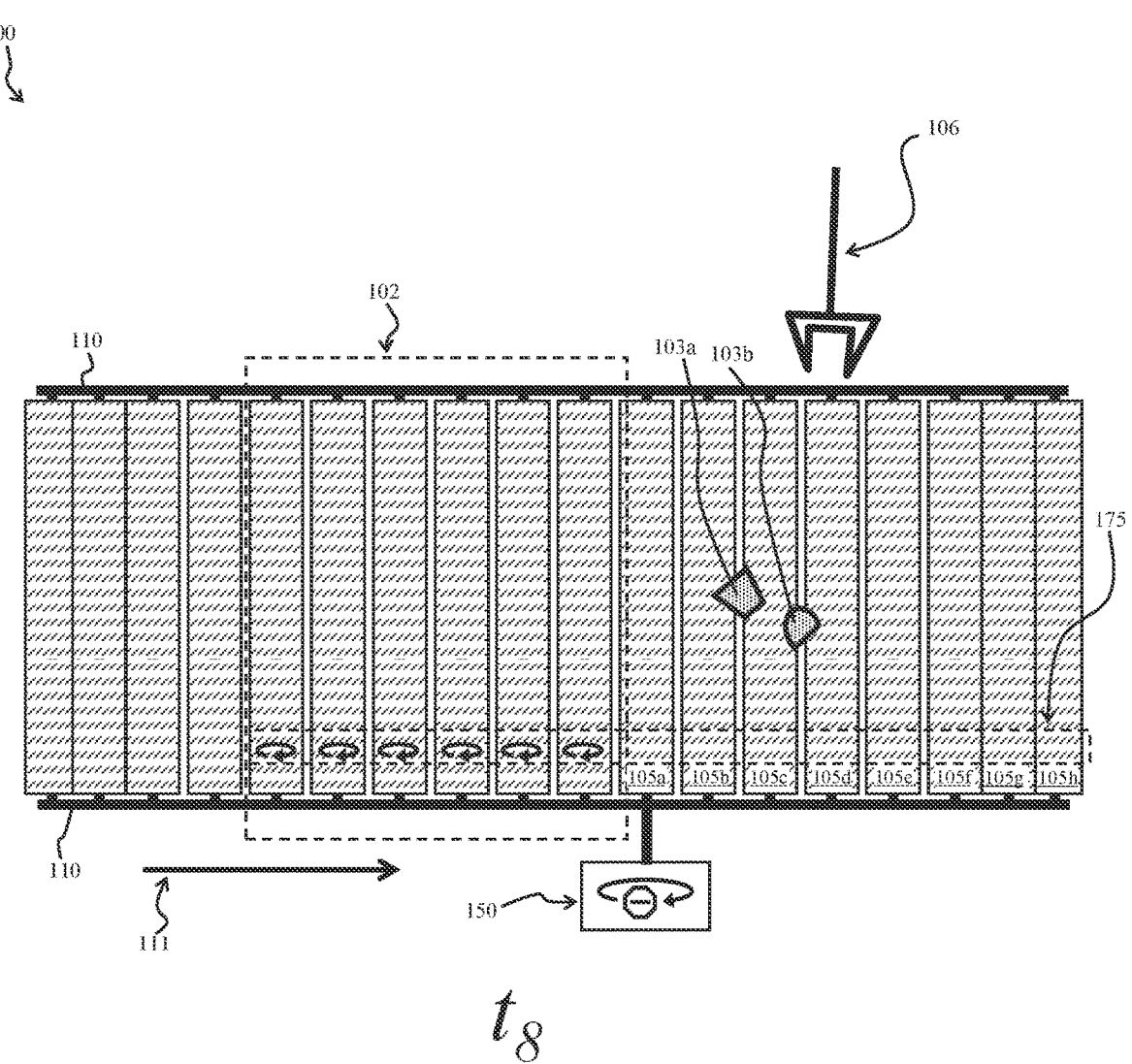

As shown in FIGS. 2H and 3H, at time $t_8$ neither of products 103*a* and 103*b* has been re-oriented since time $t_7$ because rotation of rollers 105*b*, 105*c*, and 105*d* has been arrested by rotation arrestor 150. Product 103*a* has not drifted since time $t_7$. Product 103*a* remains between rollers 105*b* and 105*c* and has moved in direction 111 as carried by rollers 105*b* and 105*c*. Product 103*b* remains between rollers 105*c* and 105*d* and has moved in direction 111 as carried by rollers 105*c* and 105*d*.

Figure 3I:
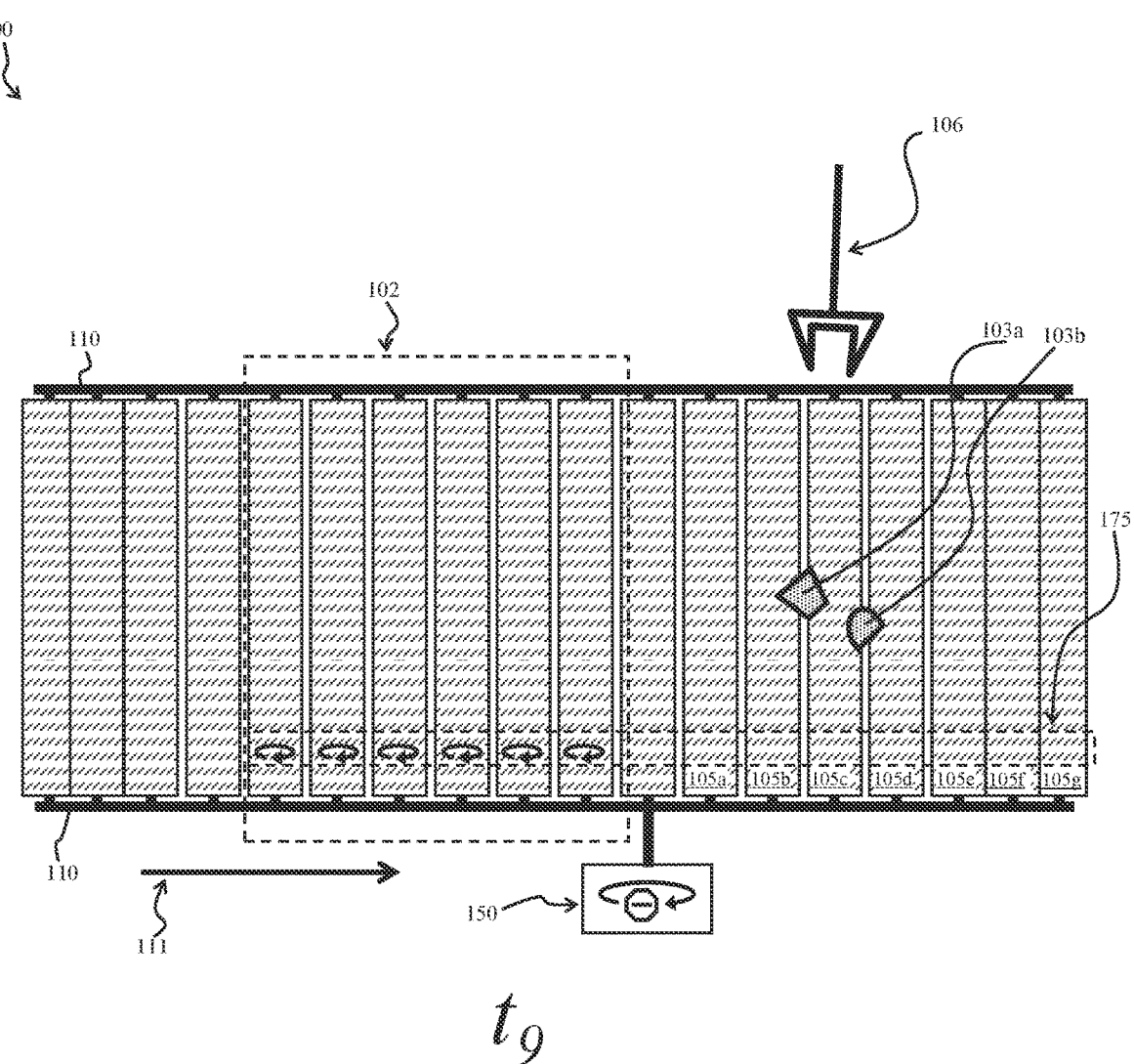

As shown in FIGS. 2I and 3I, at time ty neither of products 103*a* and 103*b* has been re-oriented since time $t_8$ because rotation of rollers 105*b*, 105*c*, and 105*d* has been arrested by rotation arrestor 150. Product 103*a* has not drifted since time $t_8$. Product 103*a* remains between rollers 105*b* and 105*c* and has moved in direction 111 as carried by rollers 105*b* and 105*c*. Product 103*b* remains between rollers 105*c* and 105*d* and has moved in direction 111 as carried by rollers 105*c* and 105*d*.

Figure 3J:
Figure 3J:
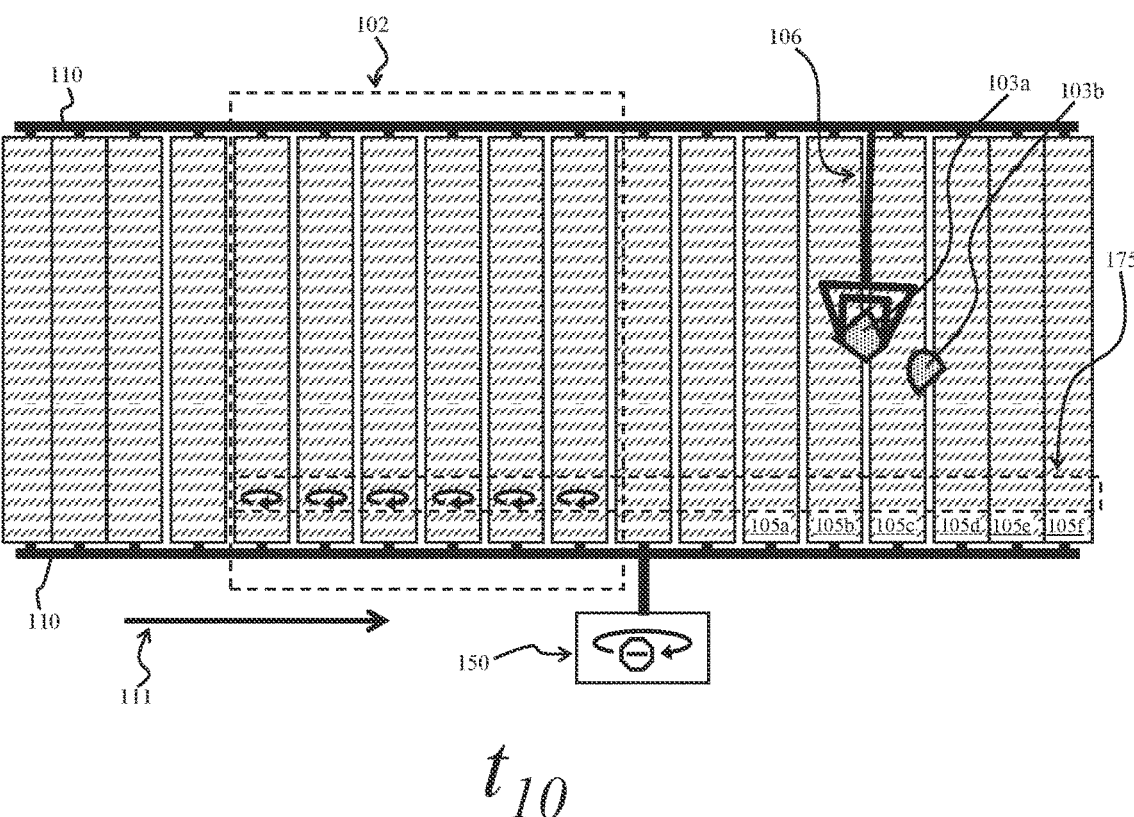
Figure 4A:
FIGS. 4A-J show side-view-perspective time snapshots of an exemplary system as described herein.
Figure 4A:
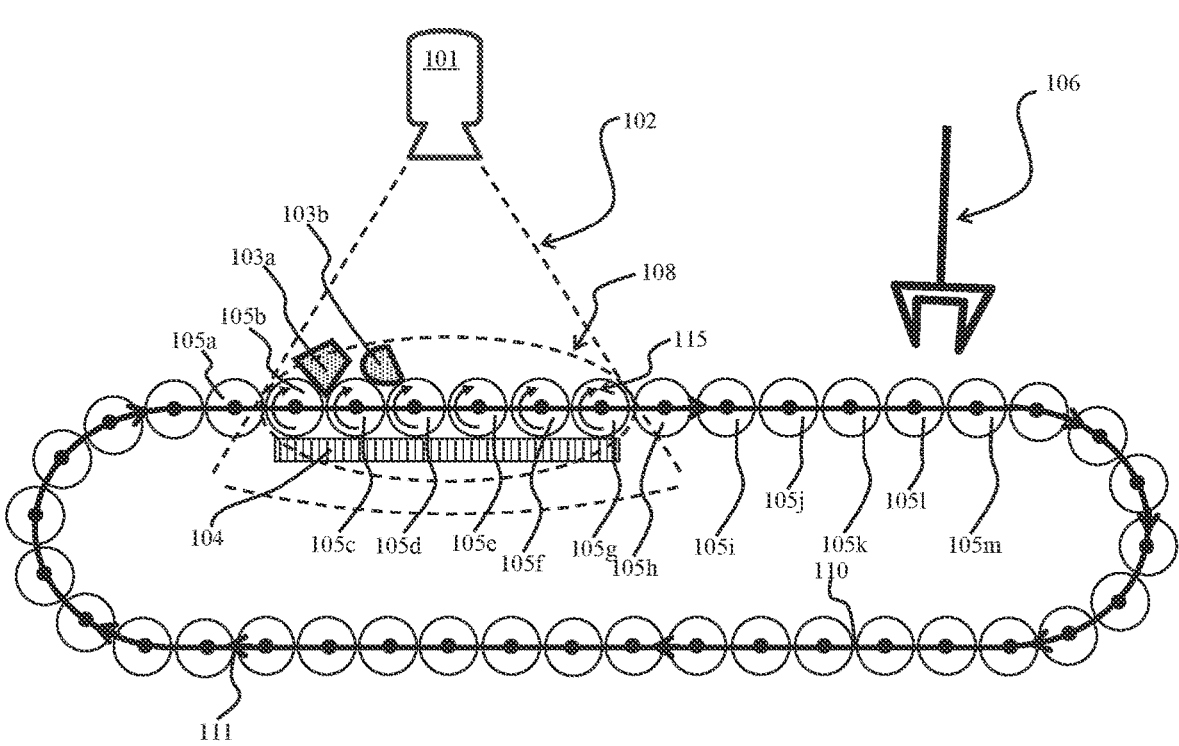
Figure 4B:
Figure 4B:
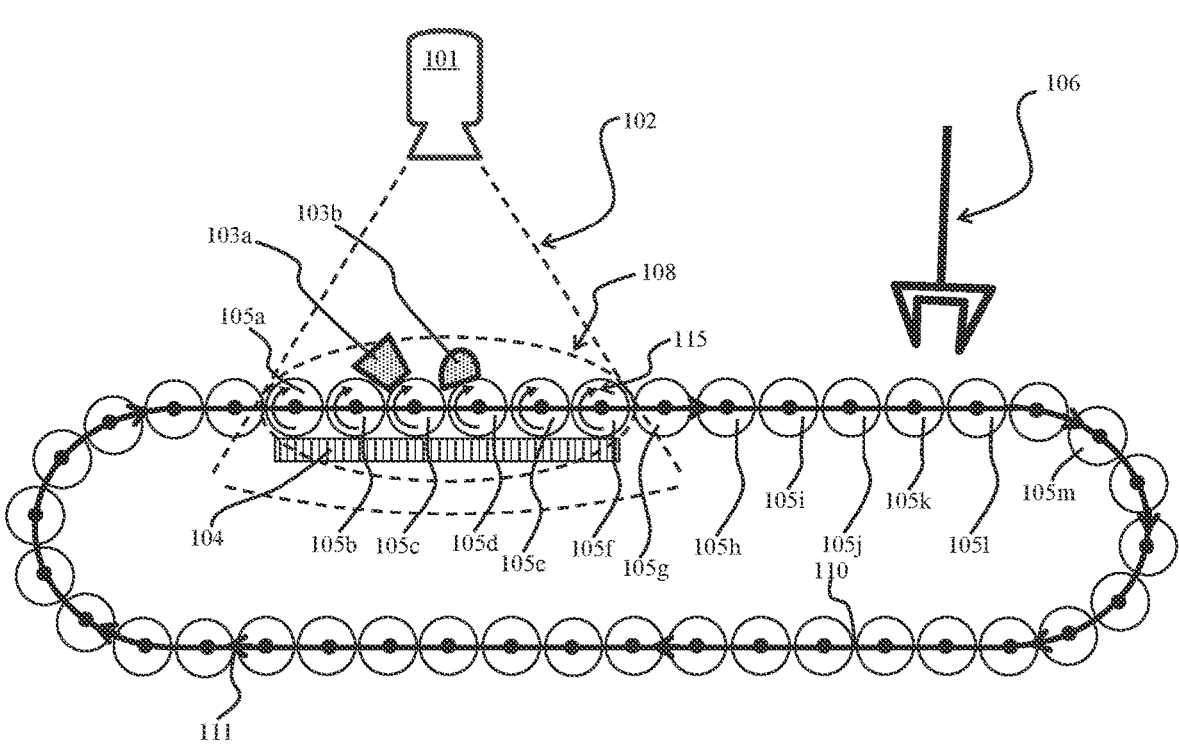
Figure 4C:
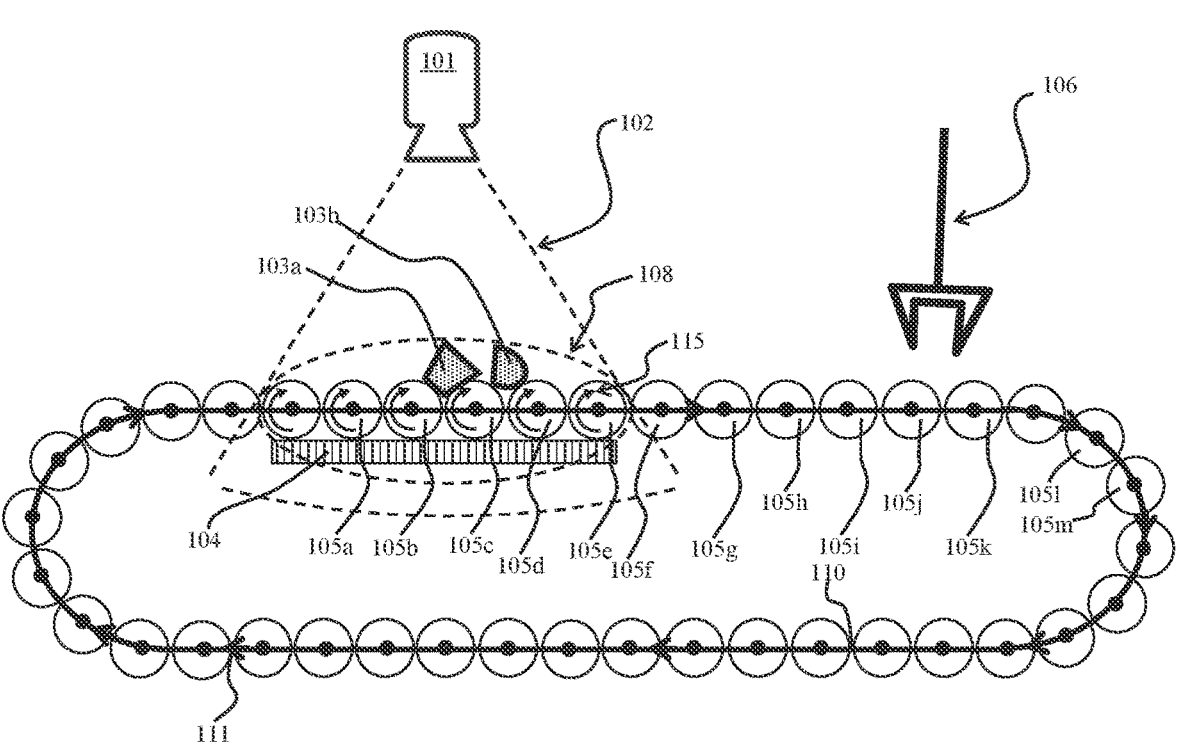
Figure 4D:
Figure 4D:
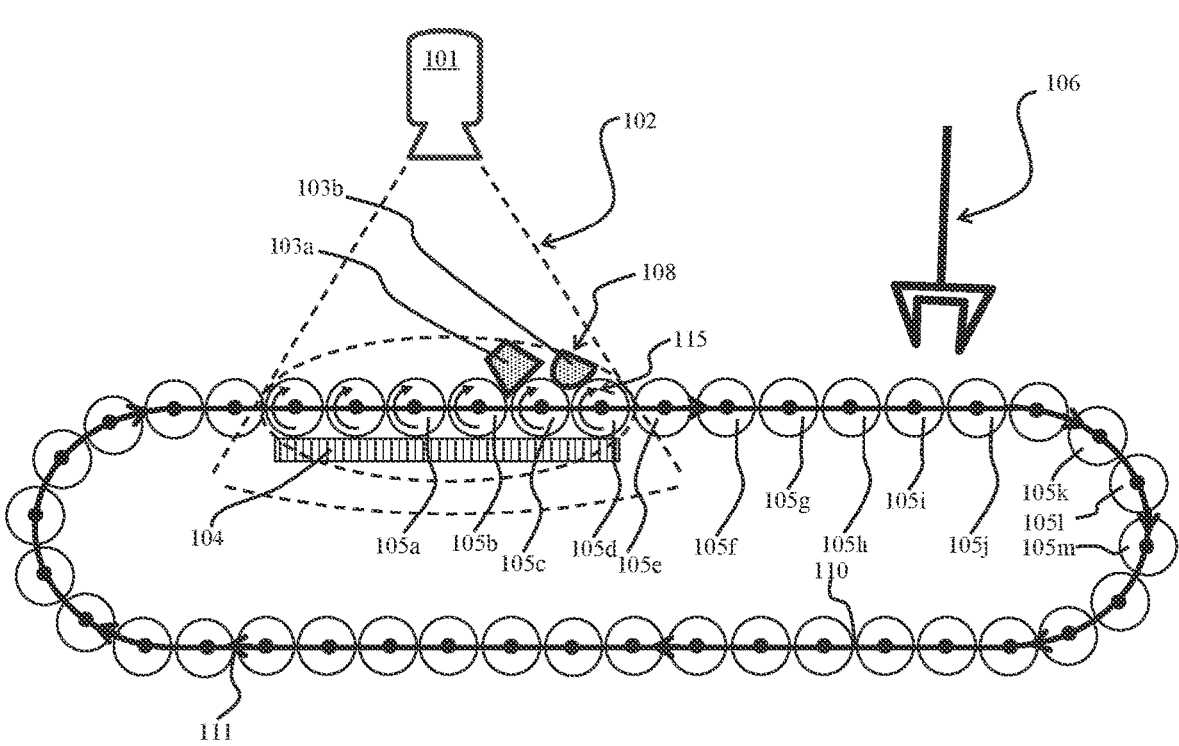
Figure 4E:
Figure 4E:
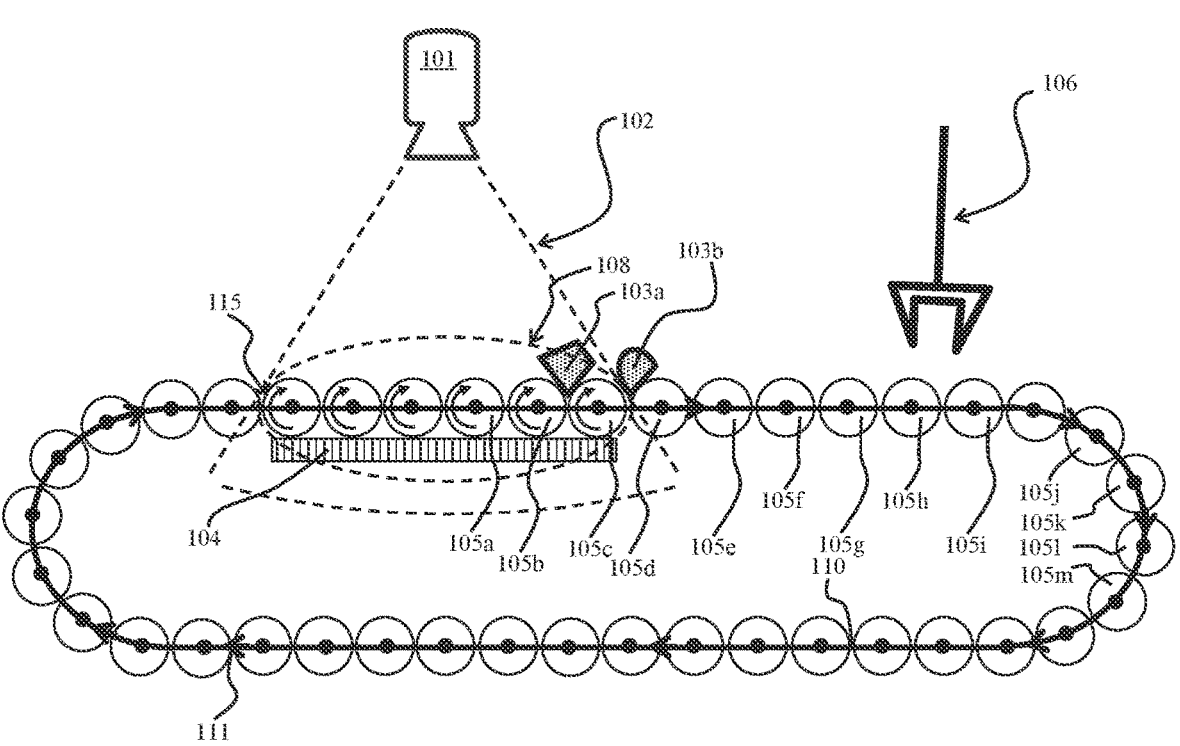
Figure 4F:
Figure 4F:
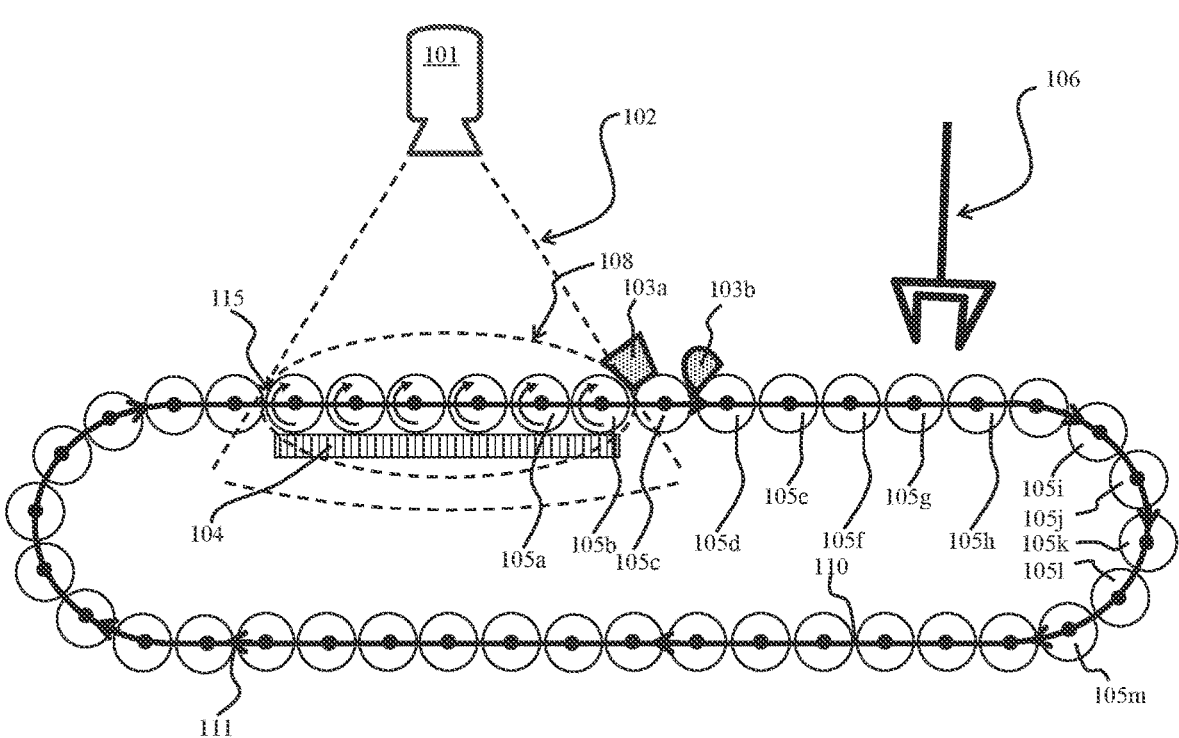
Figure 4G:
Figure 4G:
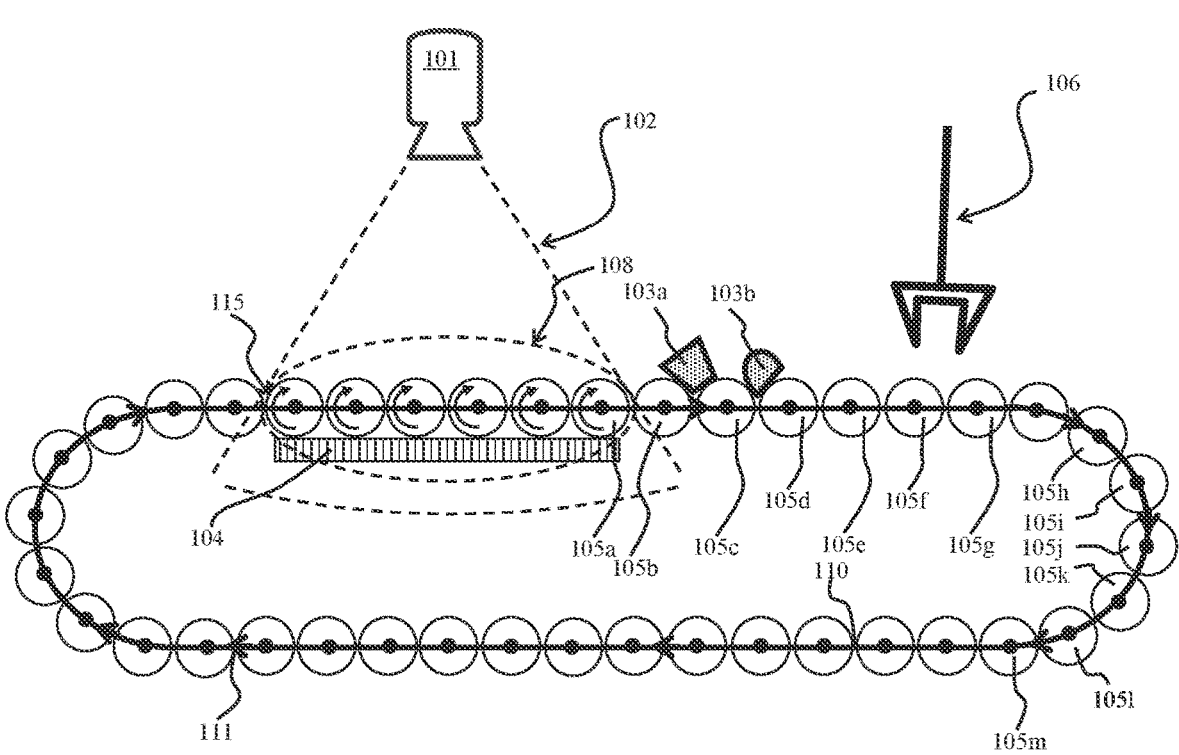
Figure 4H:
Figure 4H:
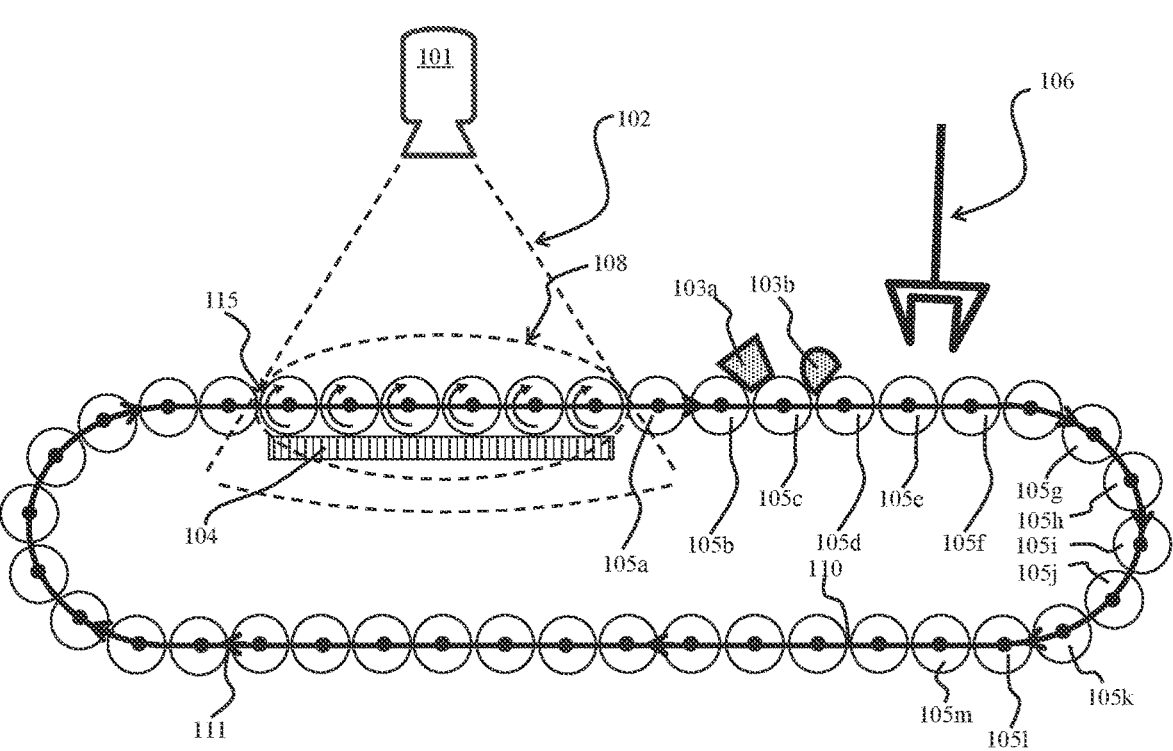
Figure 4I:
Figure 4I:
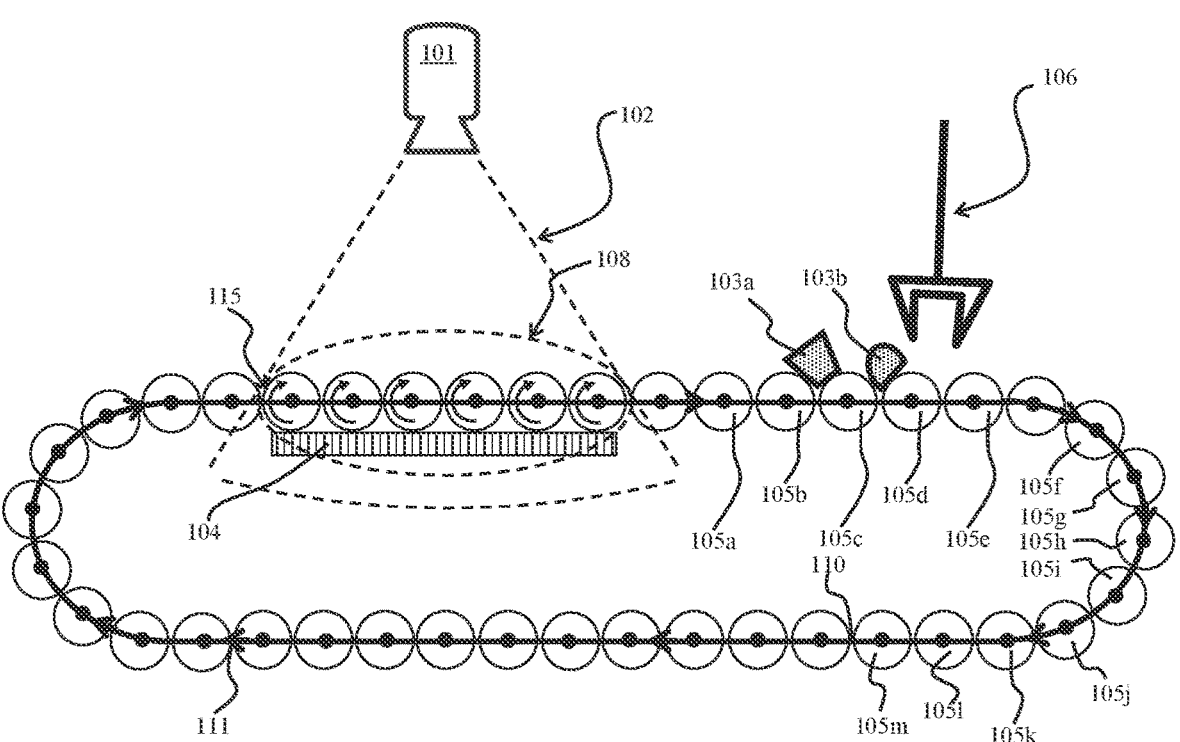
Figure 4J:
Figure 4J:
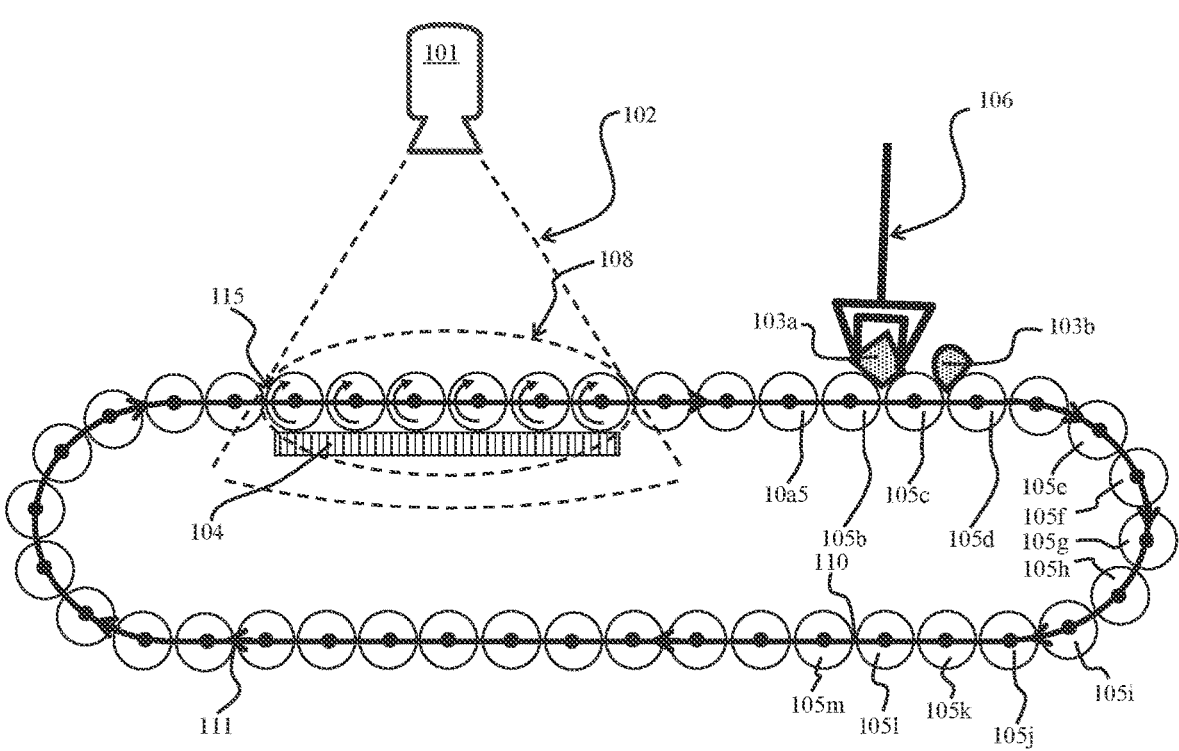
Figure 5A:
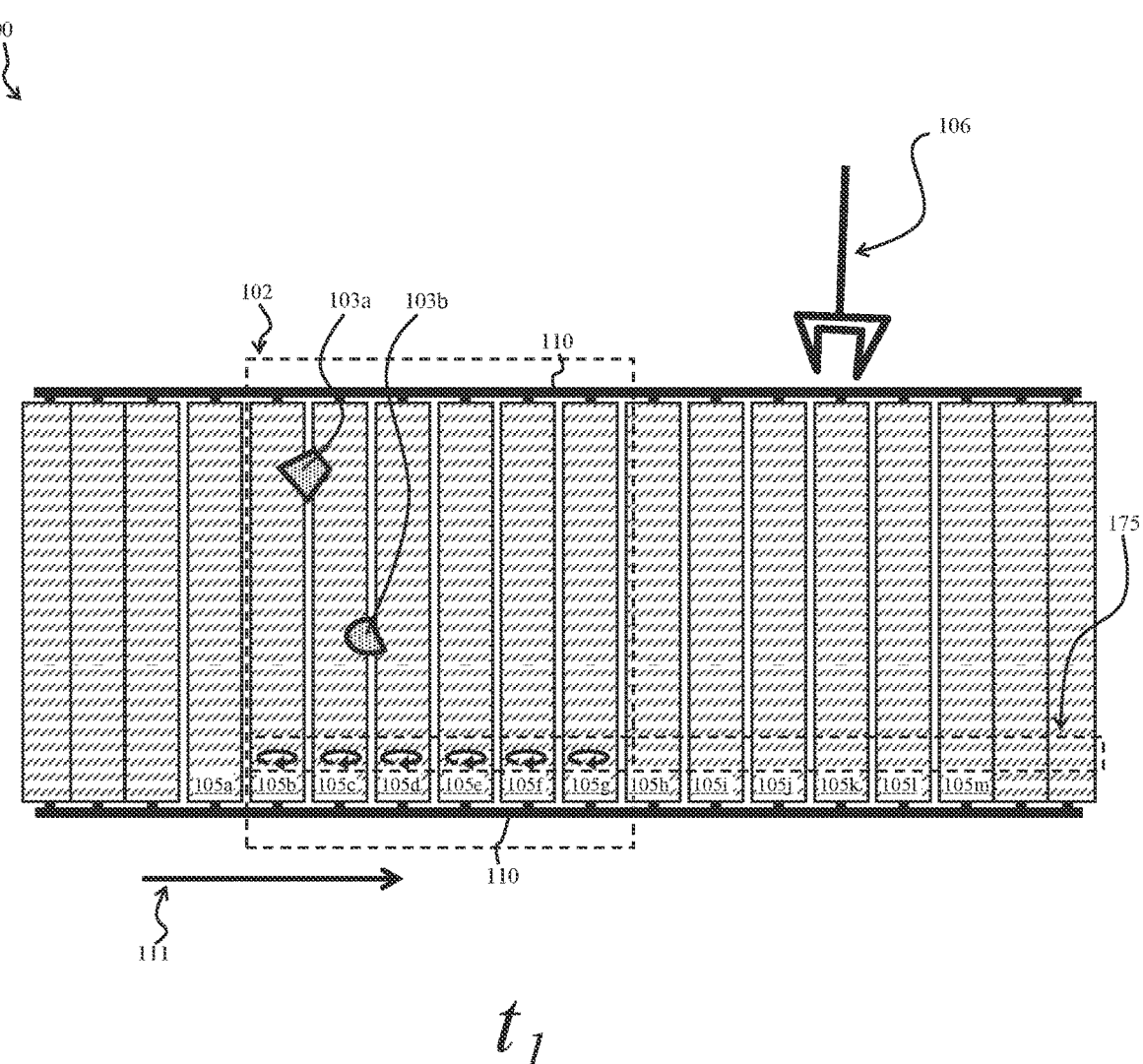
FIGS. 5A-J show overhead-perspective time snapshots of an exemplary system as described herein.
Figure 5B:
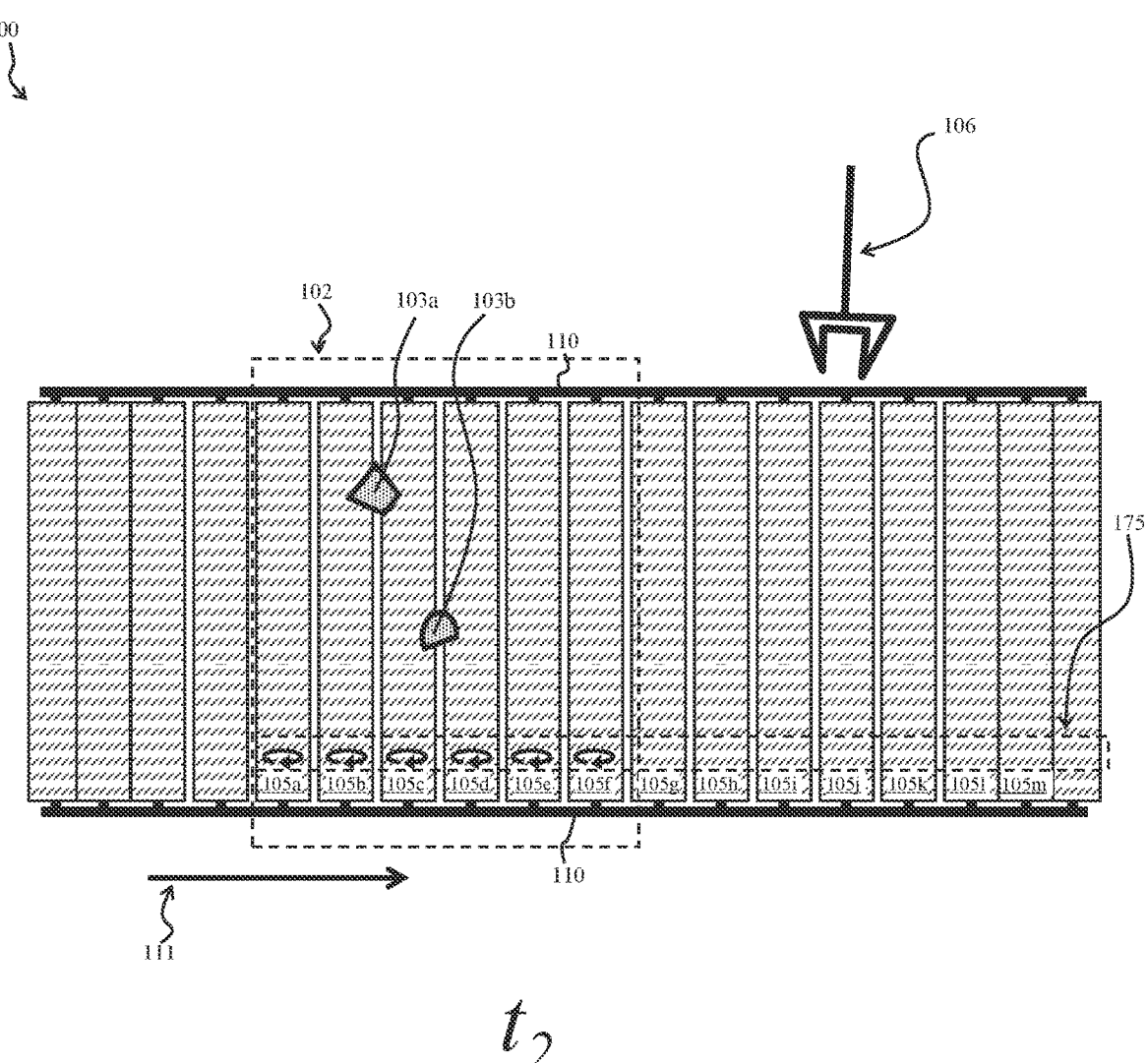
Figure 5C:
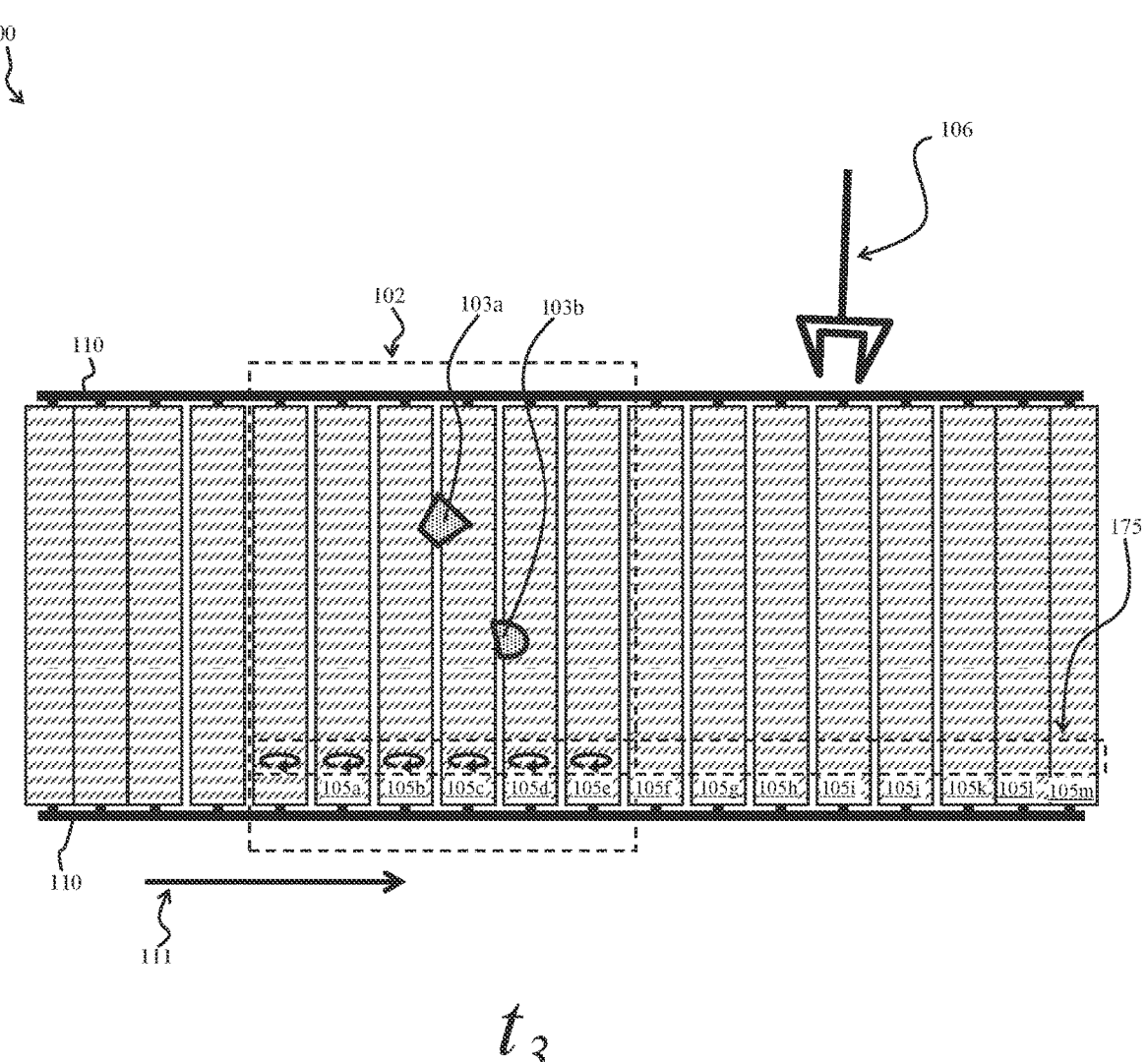
Figure 5D:
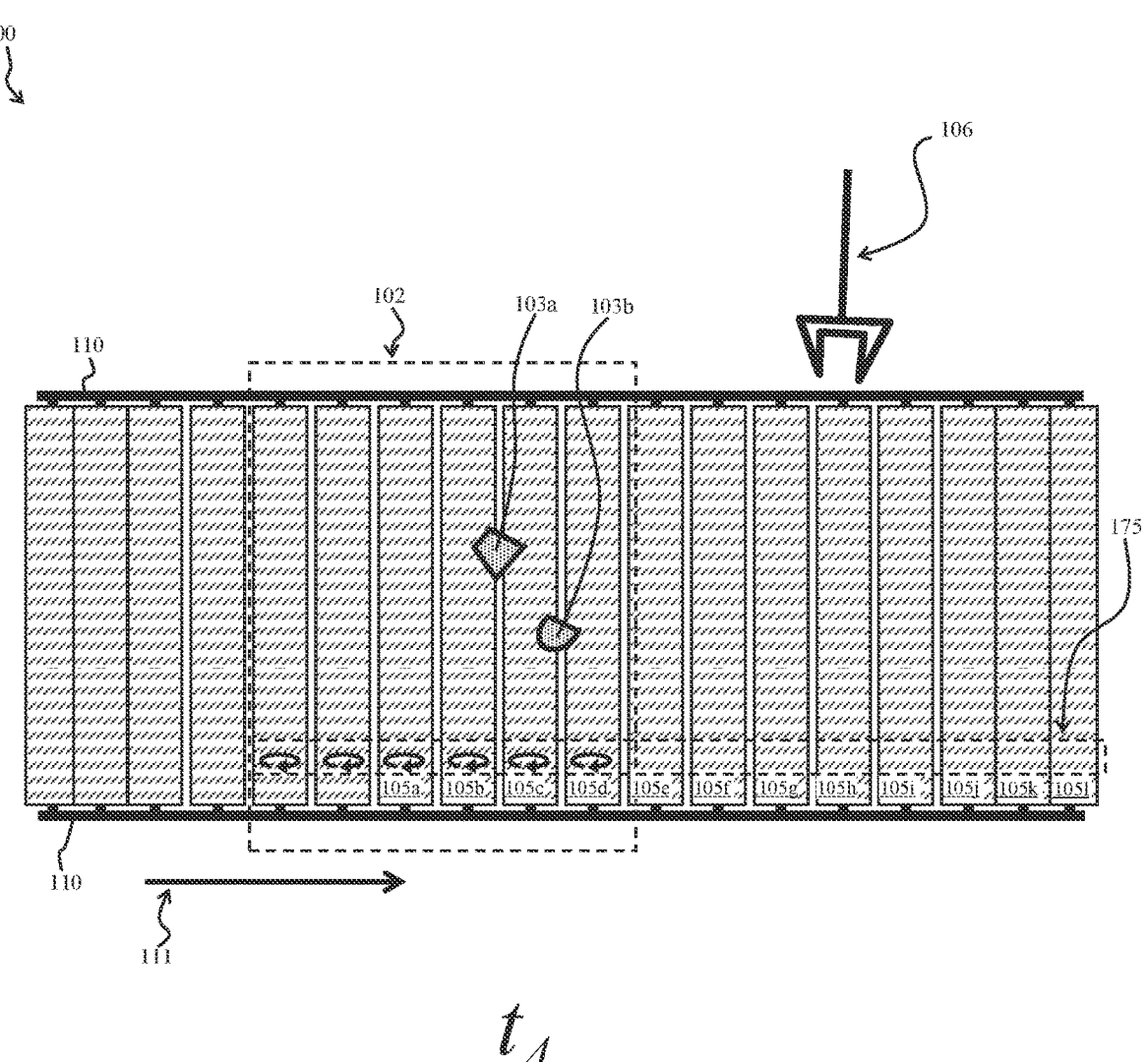
Figure 5E:
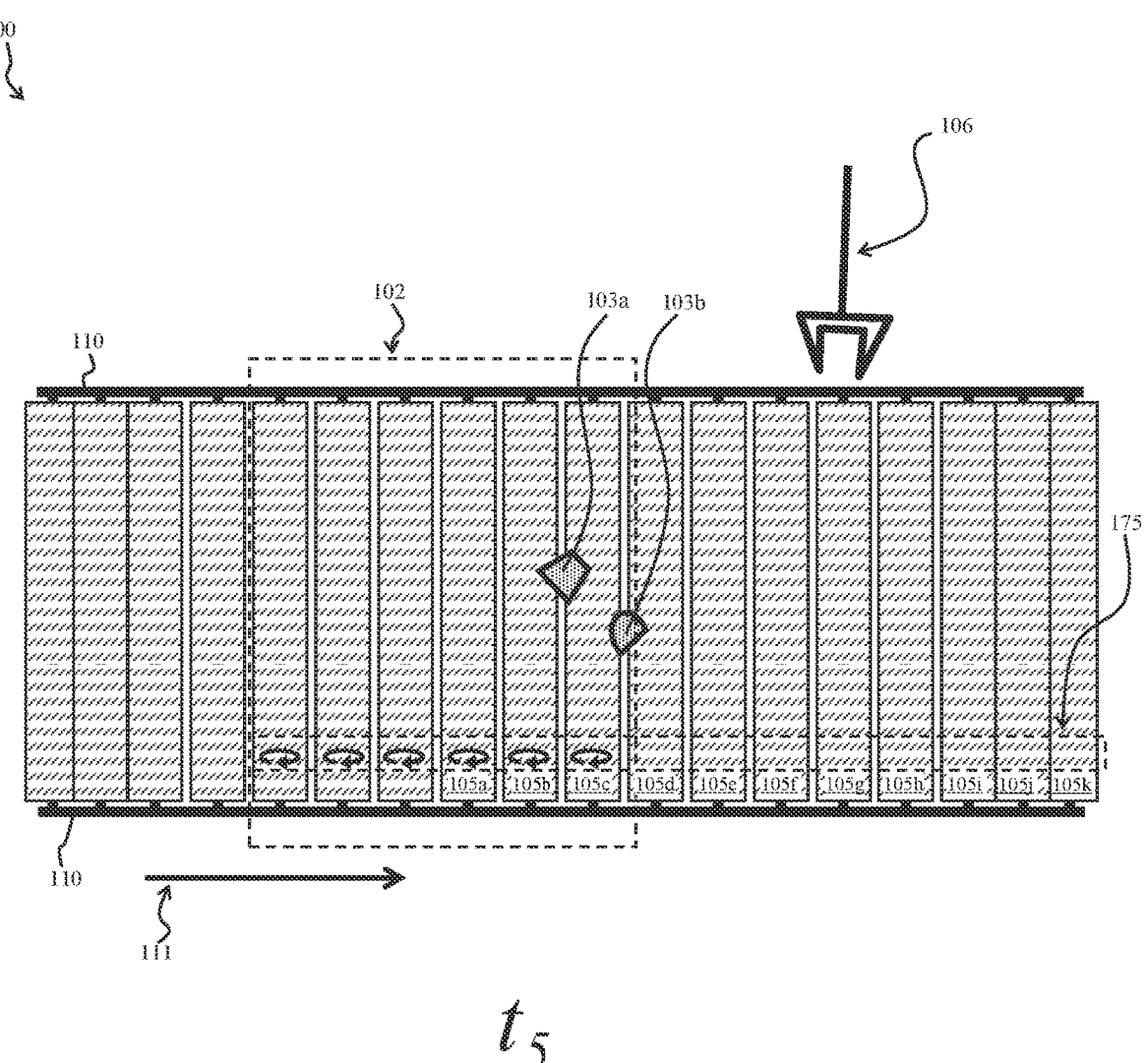
Figure 5F:
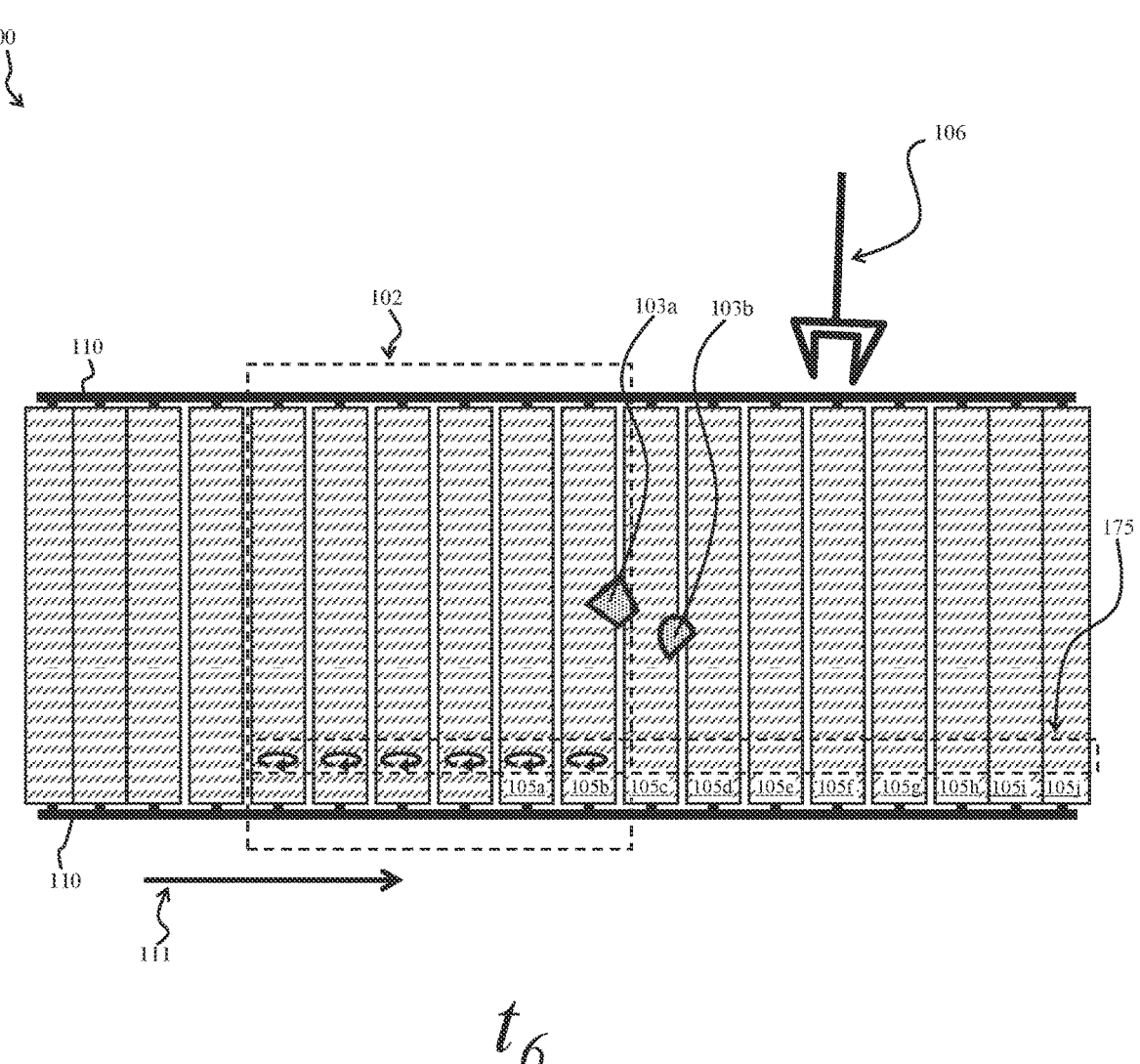
Figure 5G:
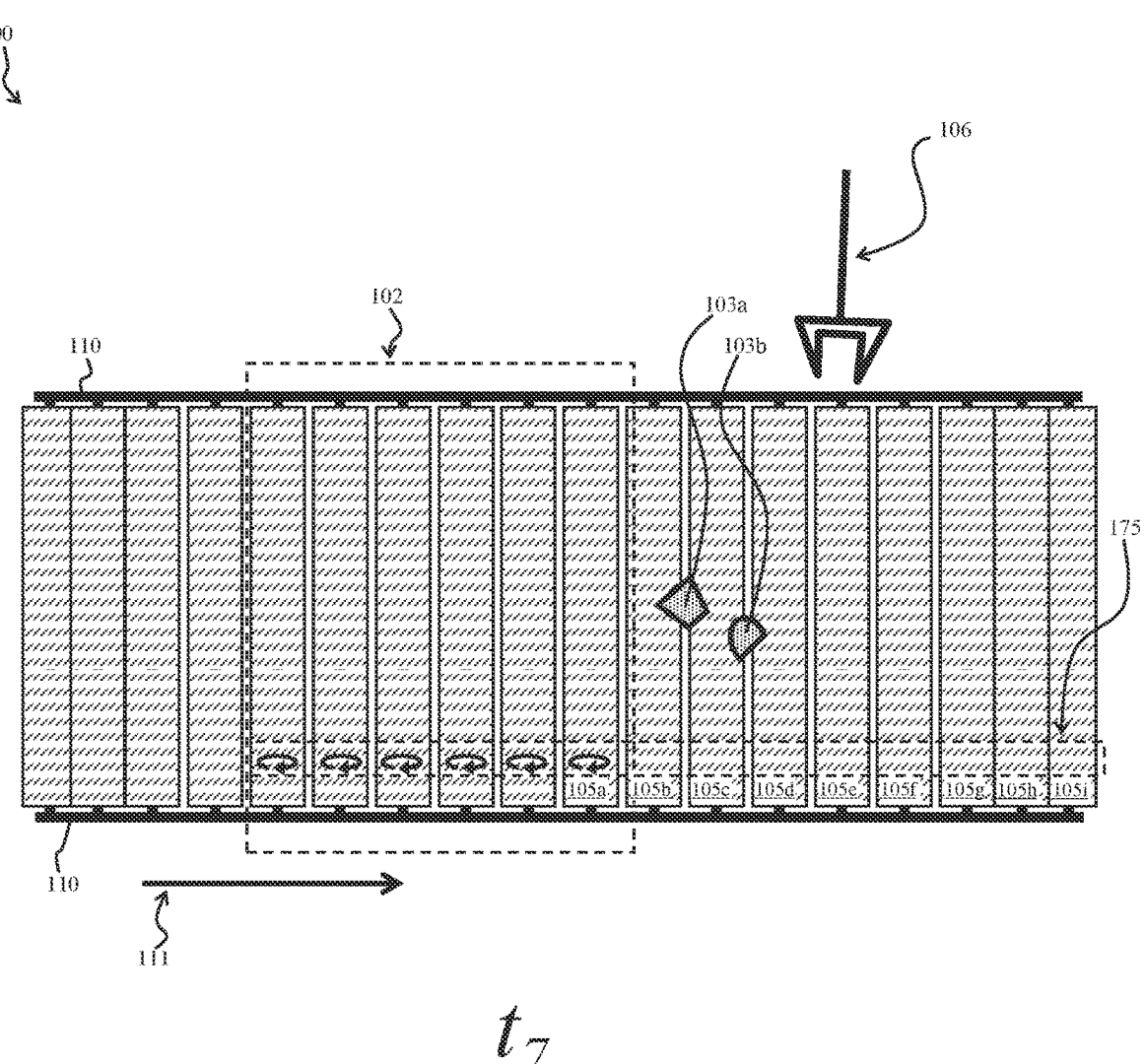
Figure 5H:
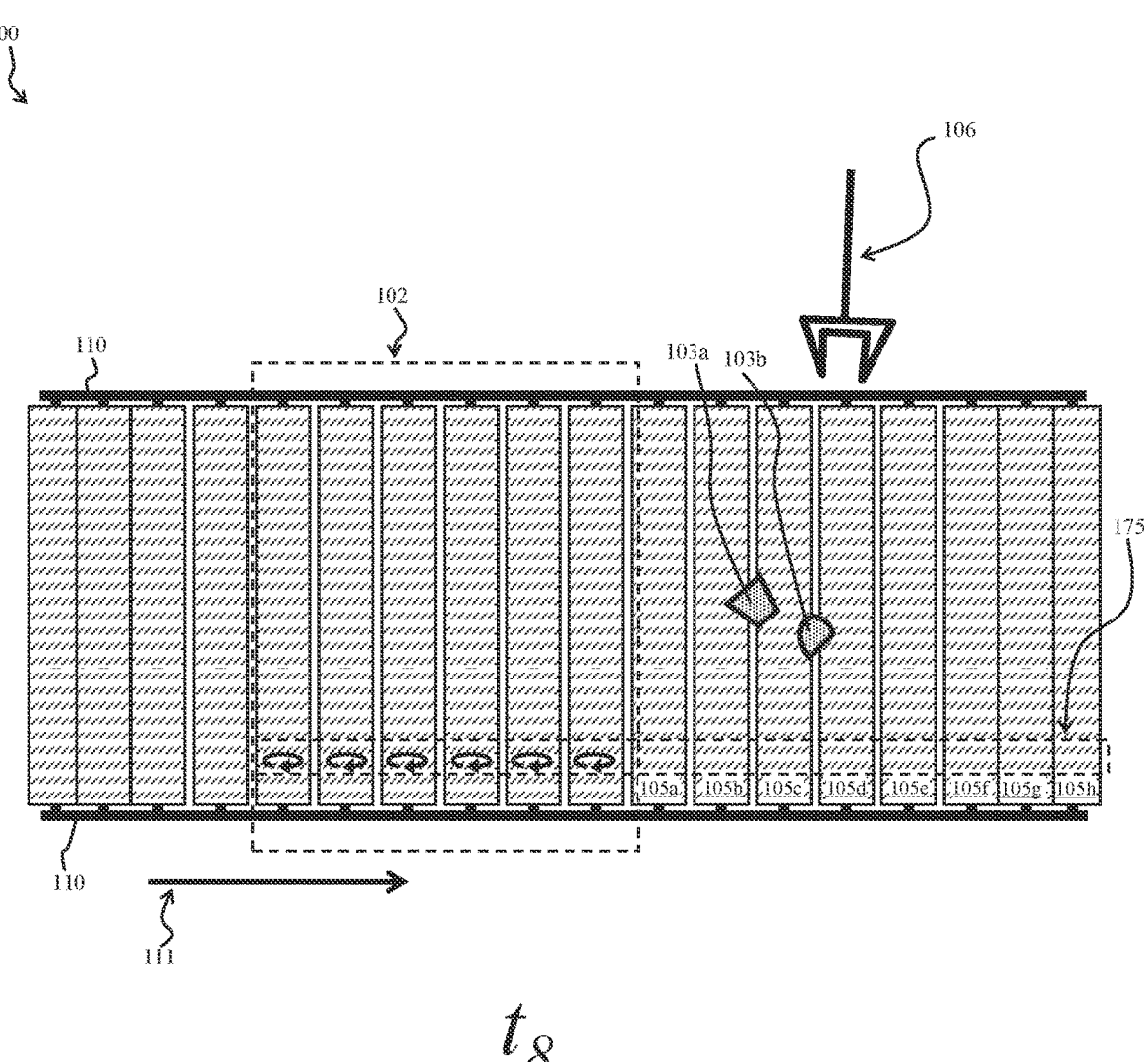
Figure 5I:
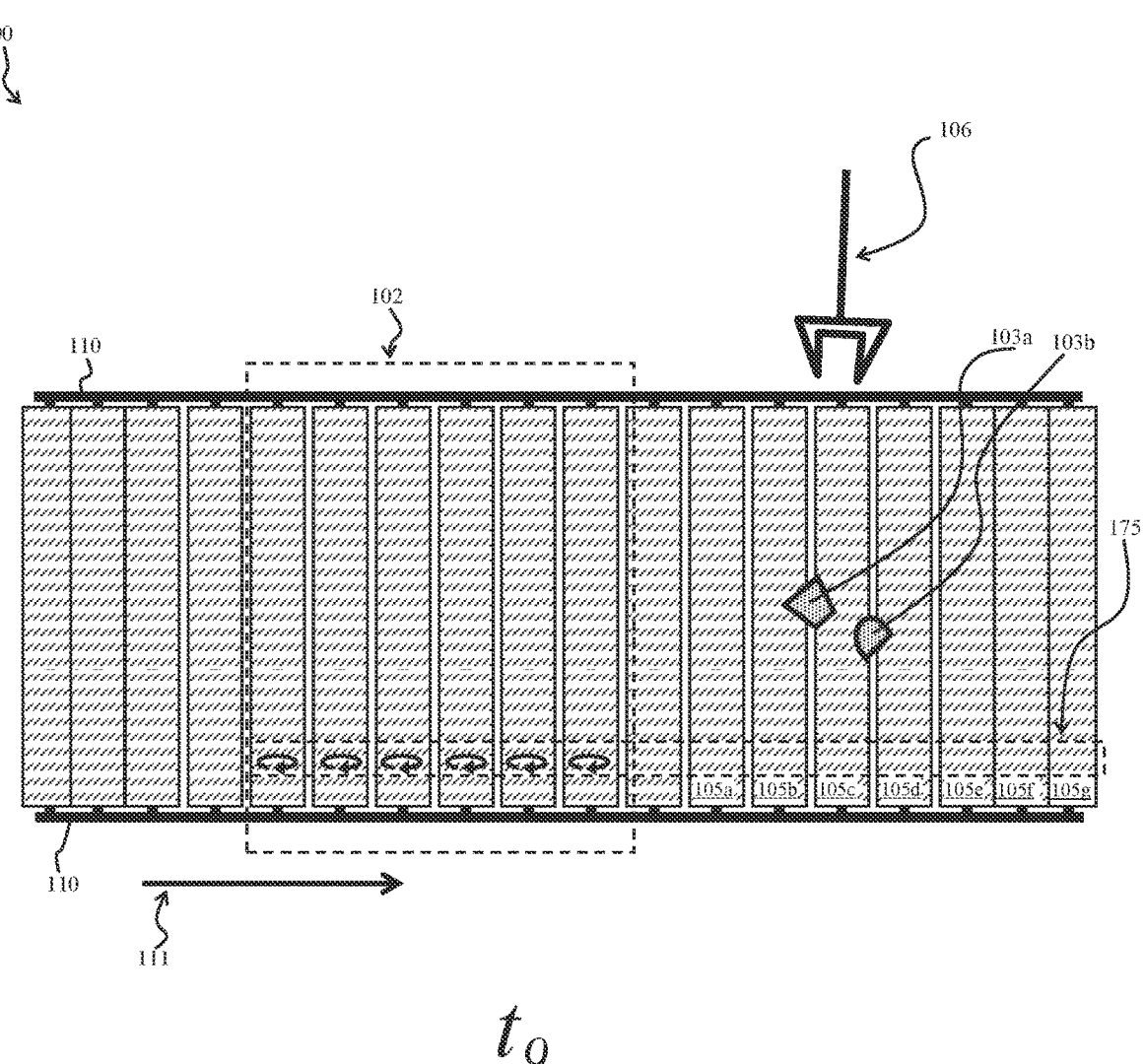
Figure 5J:
Figure 5J:
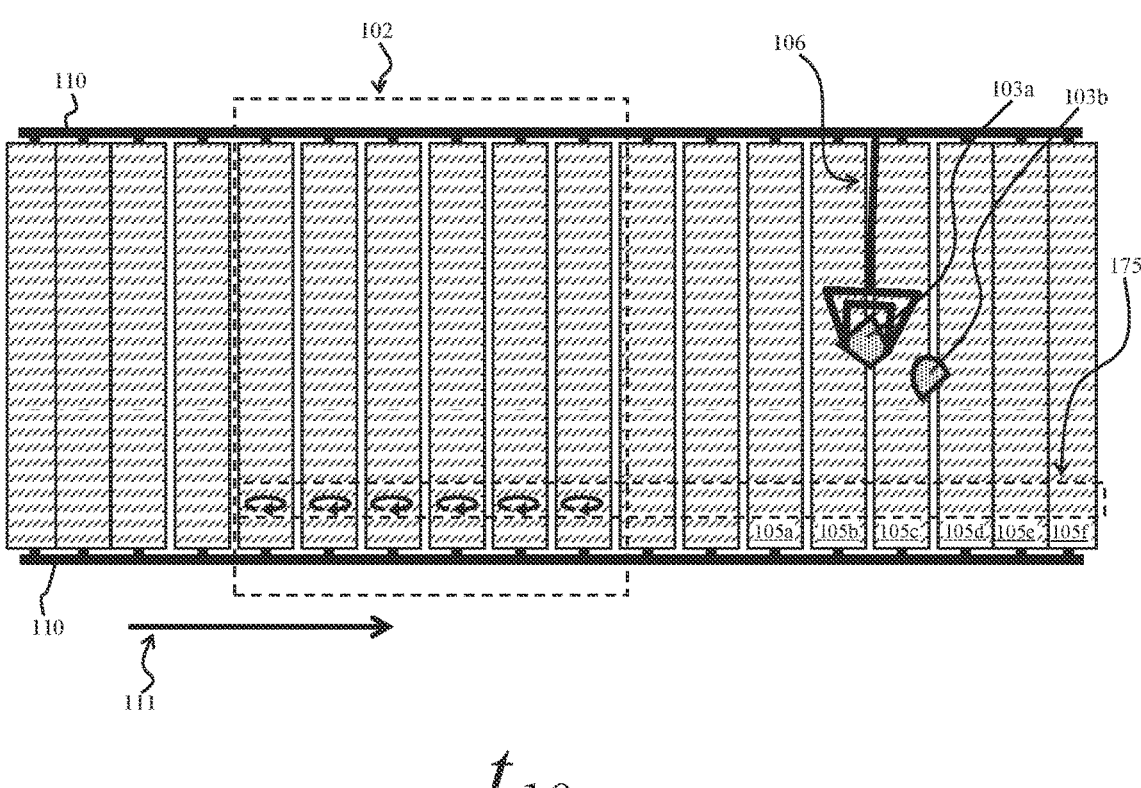

As shown in FIGS. 2J and 3J, at time $t_{10}$ neither of products 103*a* and 103*b* has been re-oriented since time tv because rotation of rollers 105*b*, 105*c*, and 105*d* has been arrested by rotation arrestor 150. Product 103*a* has not drifted since time $t_9$. Product 103*a* remains between rollers 105*b* and 105*c* and has moved in direction 111 as carried by rollers 105*b* and 105*c*. Product 103*b* remains between rollers 105*c* and 105*d* and has moved in direction 111 as carried by rollers 105*c* and 105*d*. At time $t_{10}$ system 100 is able to use picker 106 to accurately predict (or has previously accurately predicted) the location of product 103*a* and pick product 103*a* because product 103*a*'s location along the boundary between rollers 105*b* and 105*c* was determined based on an image captured by camera 101 at a time when product 103*a* was in camera 101's field of view 102, and product 103*a* did not significantly drift since that time along the boundary between rollers 105*b* and 105*c*. System 100 may determine the location at time $t_{10}$ of the boundary between rollers 105*b* and 105*c* along track 110 by using information about the speed/movement profile of track 110 and/or rollers 105*a-n* along track 110, or by using a linear encoder, or by any other means for determining linear movement and/or location known in the art. The initial location of the product or item, e.g., product 103*a*, may be determined using image recognition/processing techniques on an image captured by camera 101 and processed by system 100.

Method

Figure 6:
FIG. 6 shows a flowchart for an exemplary method as described herein.
Figure 6:
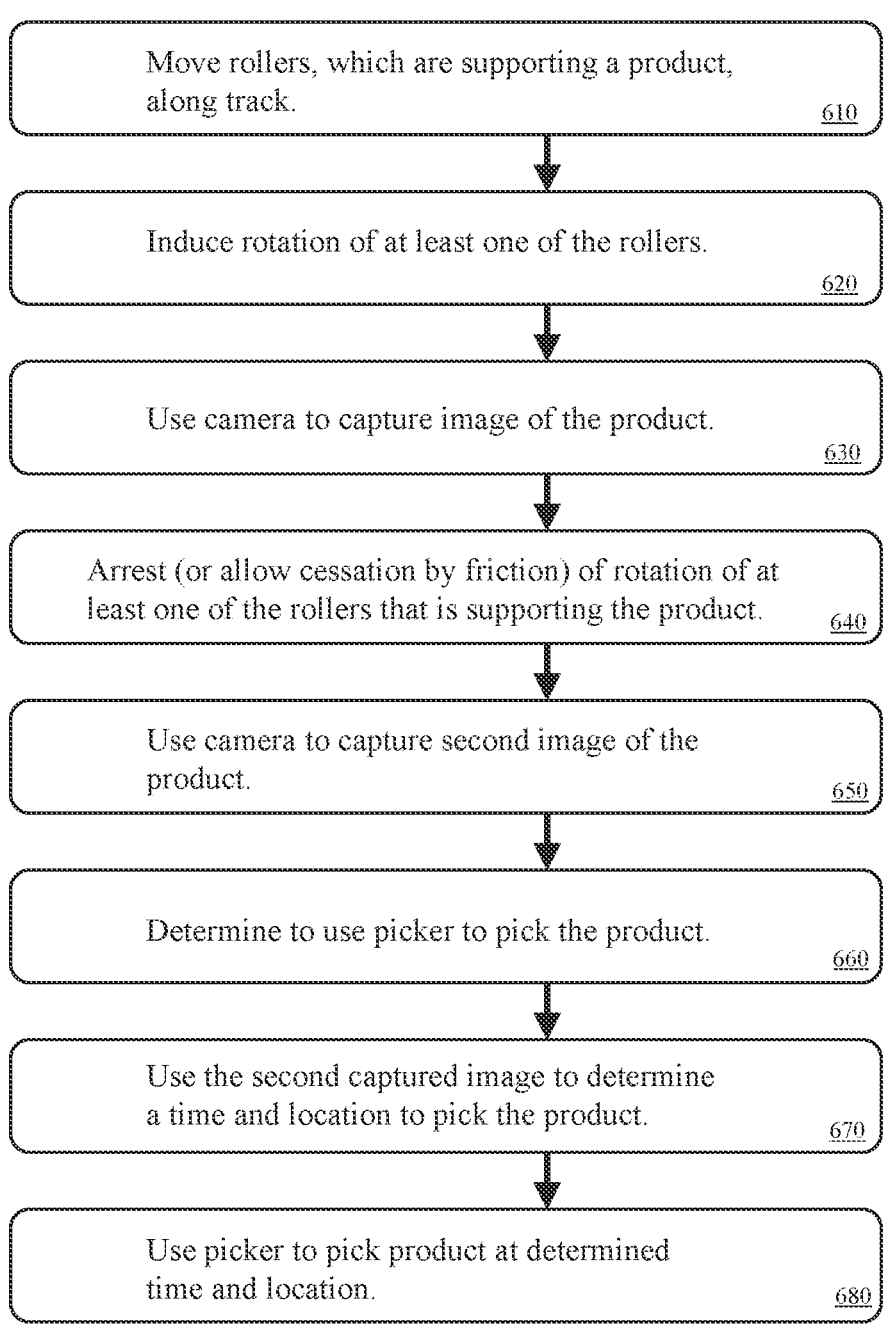

FIG. 6 shows a flowchart for an exemplary method for avoiding (and/or mitigating) drift and/or jumping, and thereby facilitating successful picking using a system as disclosed herein as shown in FIGS. 2A-5J.

At step 610, system 100 may move rollers 105*b* and 105*c*, which are supporting a product 103*a*, along a track 110.

At step 620, system 100 may induce rotation of at least roller 105*b*. In one embodiment, a traction bar may be used to induce rotation.

At step 630, system 100 may use camera 101 to capture an image of product 103*a*.

At step 640, system 100 may use a rotational arrestor to arrest rotation of roller 105*b*. Alternatively, system 100 may allow cessation of rotation to occur by rotational friction in the rollers.

At step 650, system 100 may use a camera to capture a second image of product 103*a*.

At step 660, system 100 may determine to use a picker 106 to pick product 103*a*.

At step 670, system 100 may use the second image of product 103*a* to determine a time and location to use picker 106 to pick product 103*a*.

At step 480, system 100 may use picker 106 to pick product 103*a* at the determined time and location.

What is claimed is:

1. A roller conveyor system comprising:
a track comprising a roller rotation segment and a roller non-rotation segment;
two rollers configured to move along the track in a movement direction and in sufficient proximity to each other to directly support an item between them;
a sensor device having a data capture area comprising at least some of the path that the two rollers cover as they move along a segment of the track;
an item manipulation device configured to manipulate the item in an area that is, according to the movement direction, after the roller rotation segment; and
a processing module;
wherein:
the sensor device is configured to capture both (i) at least two rotating images ("rotating images") of the item in the roller-rotation segment of the track and (ii) a second image ("second captured image") of the item after the roller rotation segment of the track;
the processing module is configured to determine, based on the rotating images, the second captured image, and on movement of the two rollers along the track: (i) an item manipulation location in or after (according to the movement direction) the roller non-rotation segment and (ii) an item manipulation time; and
the processing module is further configured to direct the item manipulation device to manipulate the item at the item manipulation location at the item manipulation time.

2. The roller conveyor system of claim 1, further comprising a rotation inducer configured to induce rotation of the two rollers in the roller rotation segment of the track.

3. The roller conveyor system of claim 2, wherein the rotation inducer is a traction bar.

4. The roller conveyor system of claim 3, wherein the traction bar extends in the movement direction to the end of the roller rotation segment and does not extend into the roller non-rotation segment.

5. The roller conveyor system of claim 4, wherein the rotational friction of the two rollers is sufficient to decrease or arrest rotation of the two rollers when not in contact with the traction bar.

6. The roller conveyor system of claim 1, further comprising a rotational arrestor to decrease or arrest rotation of the two rollers in the roller non-rotation segment.

7. The roller conveyor system of claim 6 wherein the rotational arrestor is a brake.

8. The roller conveyor system of claim 1, wherein the item manipulation device is a picker.

9. The roller conveyor system of claim 1, wherein the sensor device is a camera.

10. The roller conveyor system of claim 1,
further comprising a traction bar configured to induce rotation of the two rollers in the roller rotation segment;
wherein:
the traction bar extends in the movement direction to the end of the roller rotation segment and does not extend into the roller non-rotation segment;
the rotational friction of the two rollers is sufficient to decrease or arrest rotation of the two rollers when not in contact with the traction bar;
the item manipulation device is a picker; and
the sensor device is a camera.

* * * * *